(12) United States Patent
Wittmann et al.

(10) Patent No.: US 8,943,871 B2
(45) Date of Patent: Feb. 3, 2015

(54) CRASH TEST METHOD AND APPARATUS INCLUDING PITCH SIMULATION

(75) Inventors: Thomas Wittmann, Seattle, WA (US); Brian Dick Coughren, Murrieta, CA (US); Phillip Carl Christiansen, Seattle, WA (US); Ronald C. Lilley, Federal Way, WA (US)

(73) Assignee: Seattle Safety LLC, Kent, WA (US)

( * ) Notice: Subject to any disclaimer, the term of this patent is extended or adjusted under 35 U.S.C. 154(b) by 439 days.

(21) Appl. No.: 13/231,840

(22) Filed: Sep. 13, 2011

(65) Prior Publication Data

US 2013/0061653 A1    Mar. 14, 2013

(51) Int. Cl.
 *G01N 3/00*  (2006.01)
 *G01M 17/007*  (2006.01)

(52) U.S. Cl.
 CPC ................... *G01M 17/0078* (2013.01)
 USPC .................. 73/12.04; 7/488; 7/492; 7/12.01; 7/12.07; 7/12.09; 702/113

(58) Field of Classification Search
 CPC .. G01M 7/08; G01M 17/0078; G01L 5/0052; G01P 1/127; A42B 3/046
 USPC .................. 73/12.04, 488, 492, 12.01, 12.07, 73/12.09; 702/113
 See application file for complete search history.

(56) References Cited

U.S. PATENT DOCUMENTS

| 5,483,845 | A | * | 1/1996 | Stein et al. | 73/865.3 |
| 5,623,094 | A | * | 4/1997 | Song et al. | 73/12.07 |
| 7,316,158 | B2 | | 1/2008 | Boeck | |
| 2004/0103713 | A1 | * | 6/2004 | Voon et al. | 73/12.04 |

(Continued)

FOREIGN PATENT DOCUMENTS

| DE | 198 57 429 A1 | 6/2000 |
| DE | 101 18 682 A1 | 10/2002 |

(Continued)

OTHER PUBLICATIONS

International Search Report and Written Opinion mailed Dec. 17, 2012, issued in corresponding International Application No. PCT/US2012/054605, filed Sep. 11, 2012, 9 pages.

(Continued)

*Primary Examiner* — Peter Macchiarolo
*Assistant Examiner* — Mohammed Keramet-Amircola
(74) *Attorney, Agent, or Firm* — Christensen O'Connor Johnson Kindness PLLC

(57) ABSTRACT

A crash sled system for simulating the deceleration and pitching motion associated with vehicle crashes. A main sled is accelerated in accordance with vehicle deceleration that occurred during a crash event. A pitching platform is located above and moves with the main sled. Forward and rear guide assemblies are provided which are located along the sides of the pitching platform when the main sled and pitching platform are in the pre-launch position. When the main sled is launched, the front and rear ends of the pitching platform travel along paths established by the guide assemblies. Prior to launch, the guide assemblies are set to angles of inclination that provide linear approximations to paths for the forward and aft ends of the pitching platform that will result in pitching motion experienced by vehicles during the crash events being simulated. Variously configured guide assemblies are disclosed that provide design trade-off between simulation accuracy and system complexity.

22 Claims, 17 Drawing Sheets

(56) References Cited

U.S. PATENT DOCUMENTS

2004/0230394 A1* 11/2004 Saari et al. .................. 702/113
2010/0288013 A1* 11/2010 Moser et al. ................. 73/12.04

FOREIGN PATENT DOCUMENTS

| | | |
|---|---|---|
| DE | 198 05 512 B4 | 9/2004 |
| DE | 10 2005 010 189 B3 | 11/2006 |
| DE | 10 2007 056 573 A1 | 6/2009 |
| JP | 2006-138700 A | 1/2006 |
| JP | 2006-138700 A | 6/2006 |
| JP | 2006-138701 A | 6/2006 |
| JP | 2006-138736 A | 6/2006 |
| JP | 2007-114084 A | 5/2007 |
| JP | 2008-175777 A | 7/2008 |
| JP | 2008-175778 A | 7/2008 |
| JP | 2009-204394 A | 9/2009 |
| JP | 2009-204395 A | 9/2009 |

OTHER PUBLICATIONS

DeLeeuw, M., "Crash Sleds Test Automakers' Interior Designs," Instron Structural Testing—Test & Measurement World, Mar. 1, 2005, <http://tmworld.com/design/design-and-prototyping/4379654/Crash-sleds-test-automakers-interior-designs>, 2 pages.

"Hydropuls® —Crash-Simulation System," Instron Structural Testing Systems, Jun. 13, 2005, <http://www.instron.com/wa/library/streamfile.aspx?doc=974>, 4-page product brochure.

"Pitching Simulation: Importance and History," Instron Structural Testing Systems, 8-pages, as early as Jun. 2005.

Berge, S., et al., "Simulation of Vehicle Pitch in Sled Testing," SAE International, Technical Paper 850098, Feb. 1985, pp. 127-131.

* cited by examiner

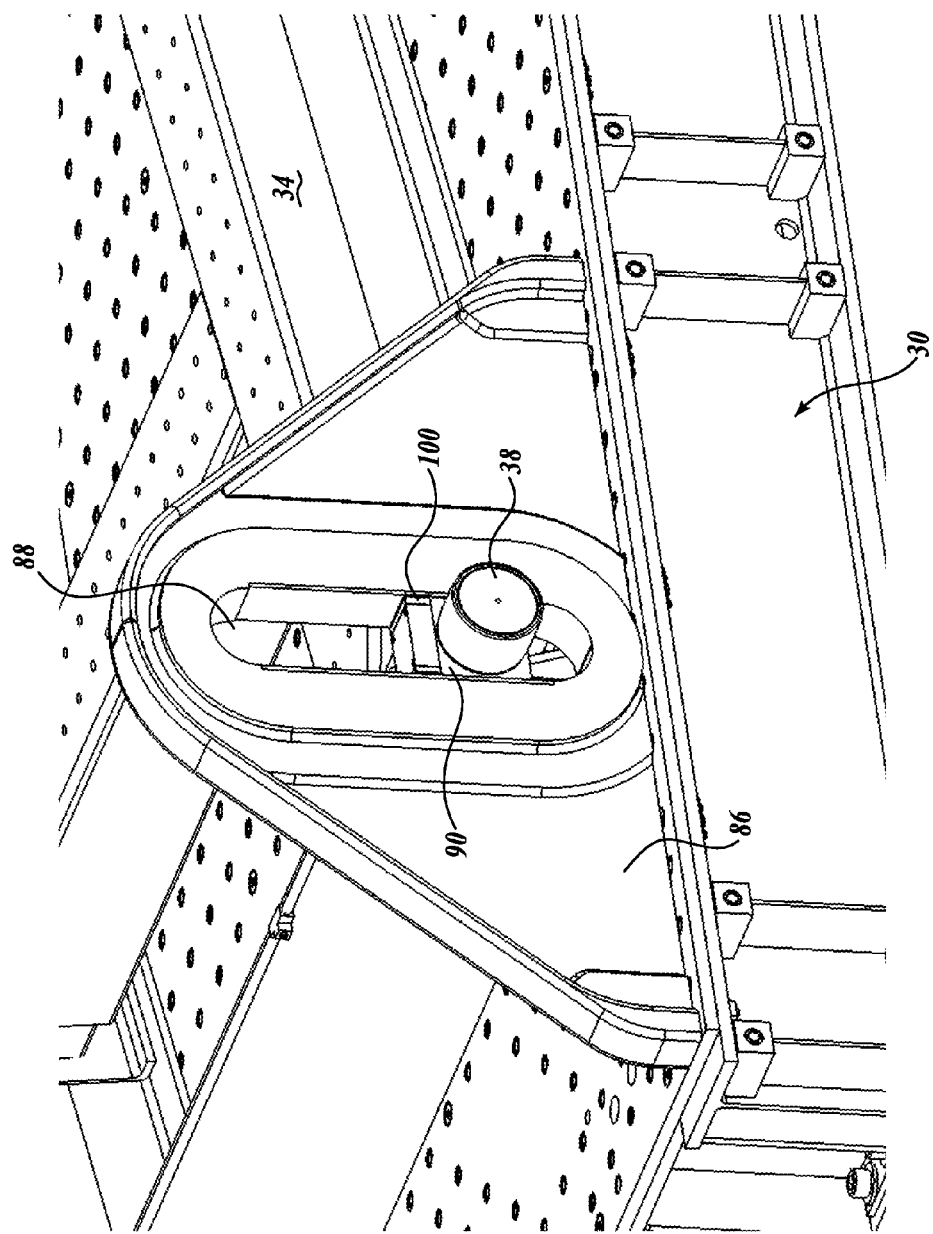

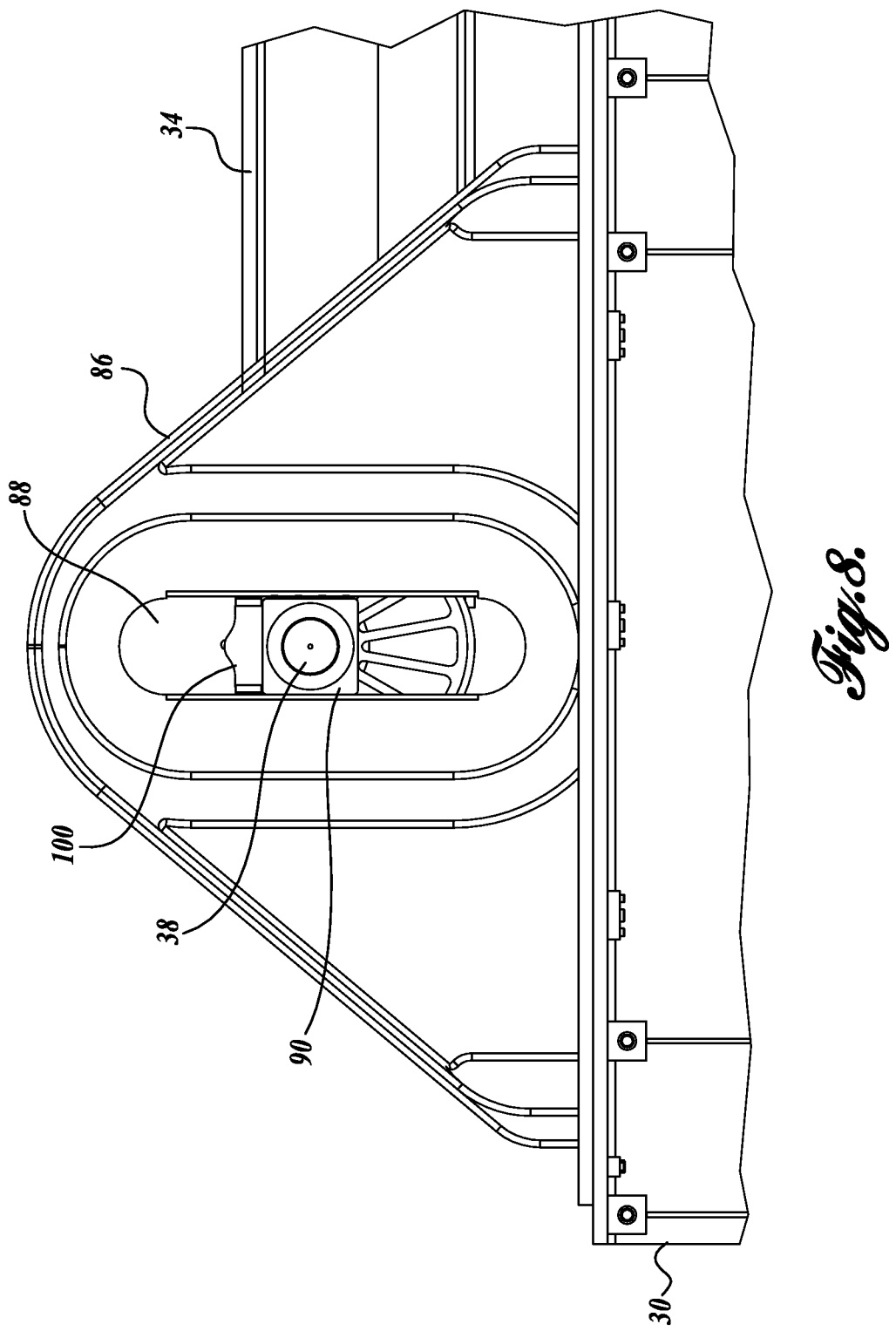

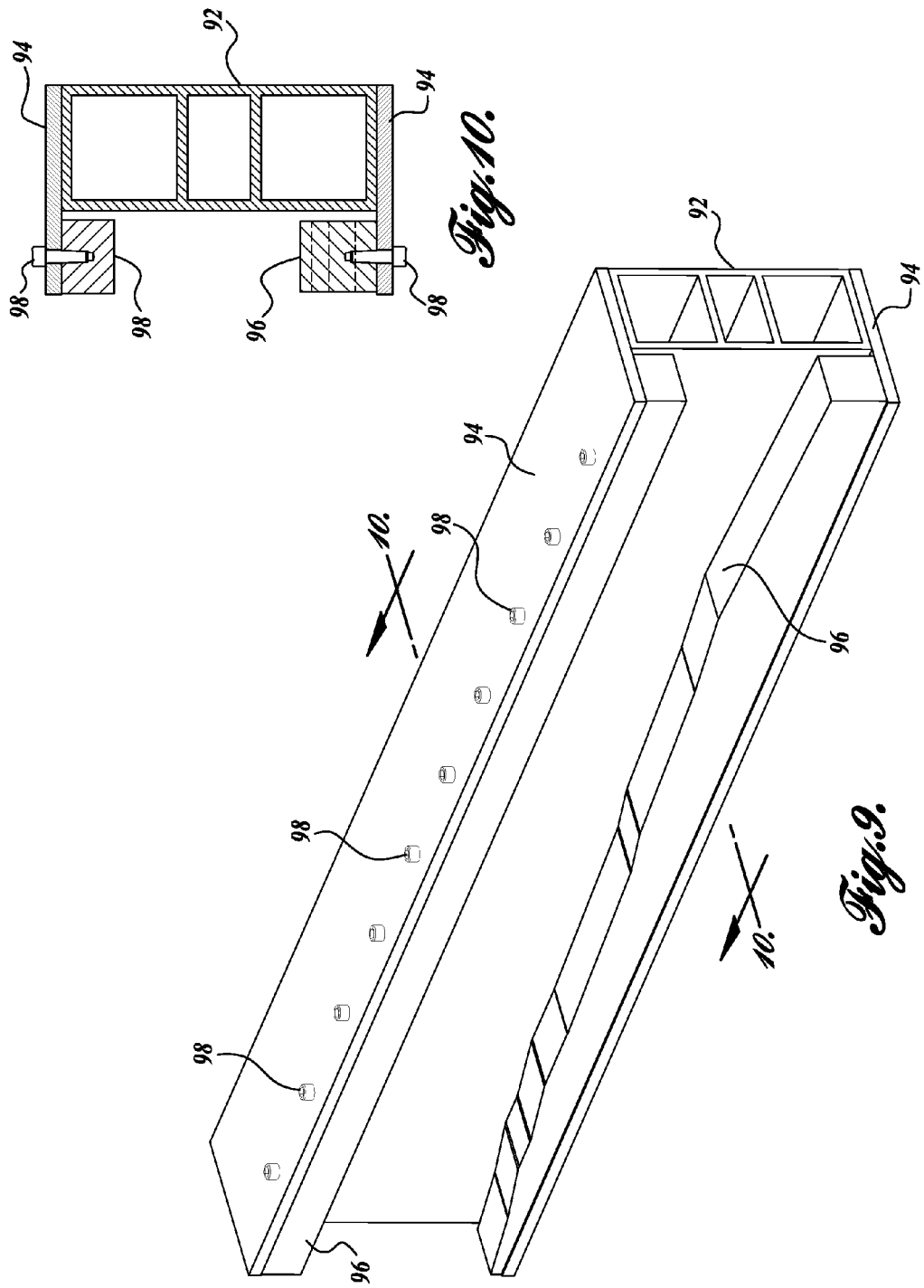

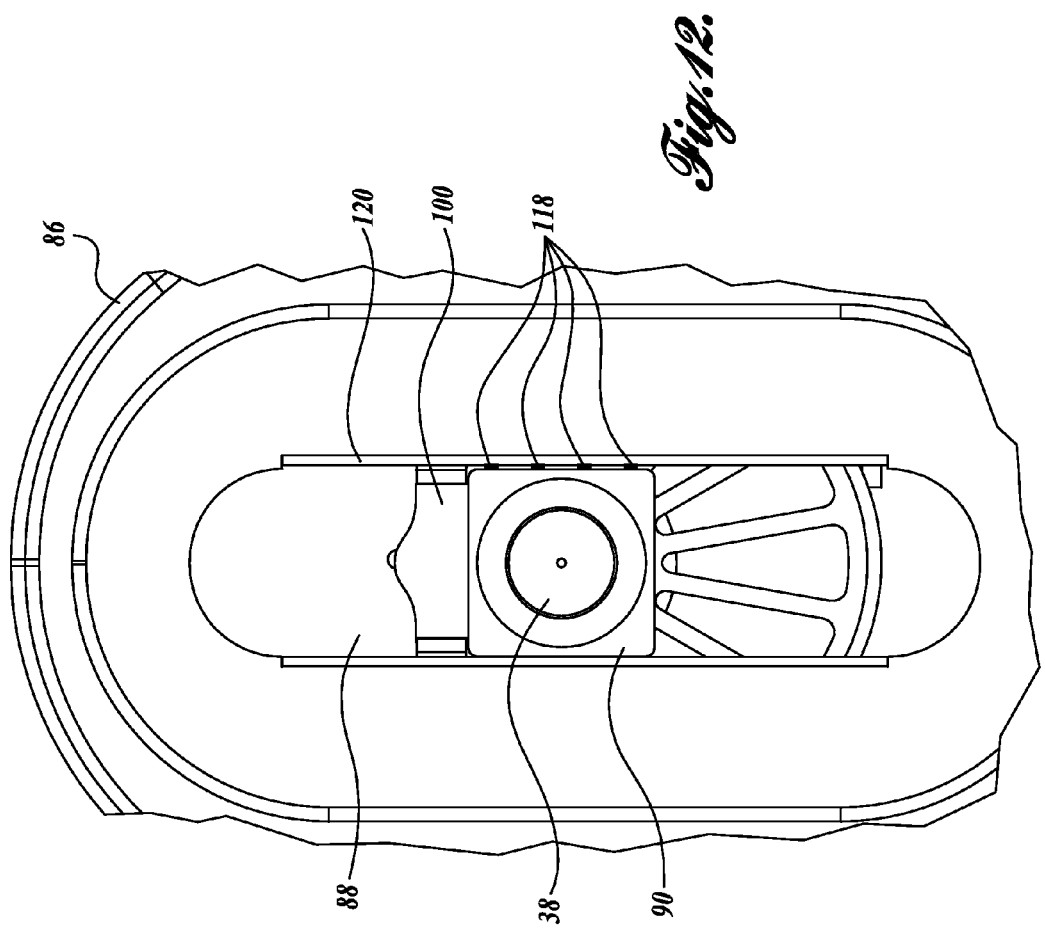

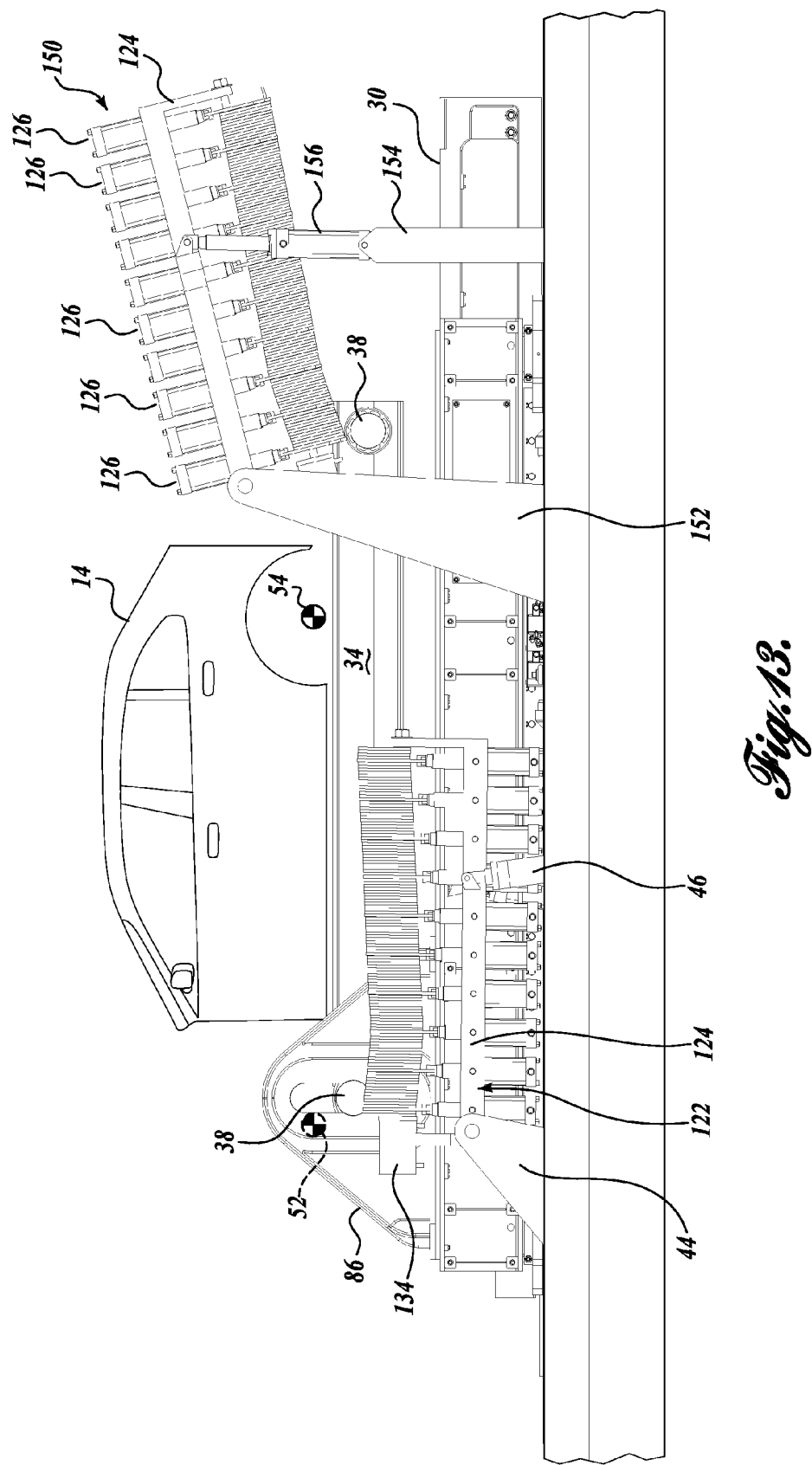

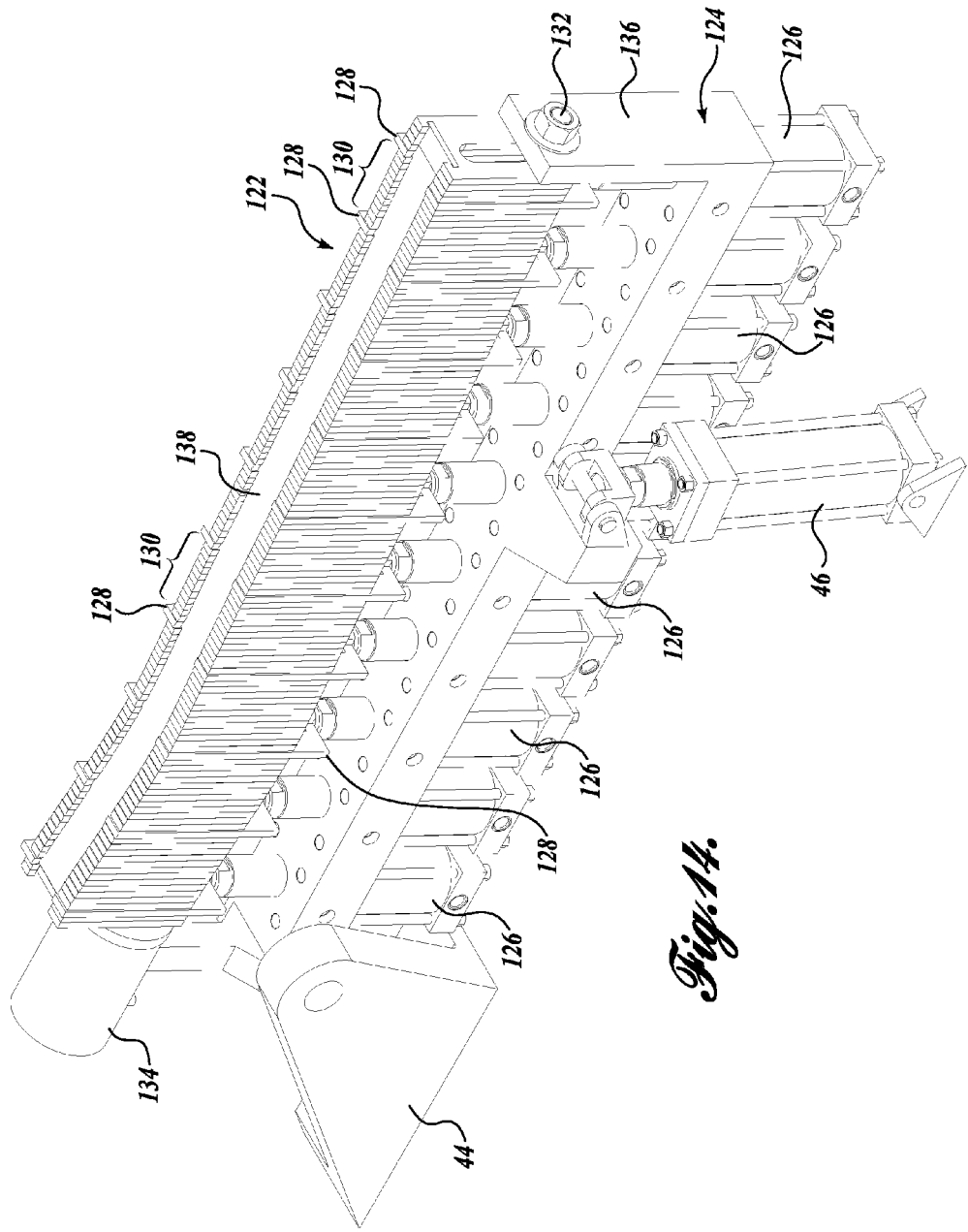

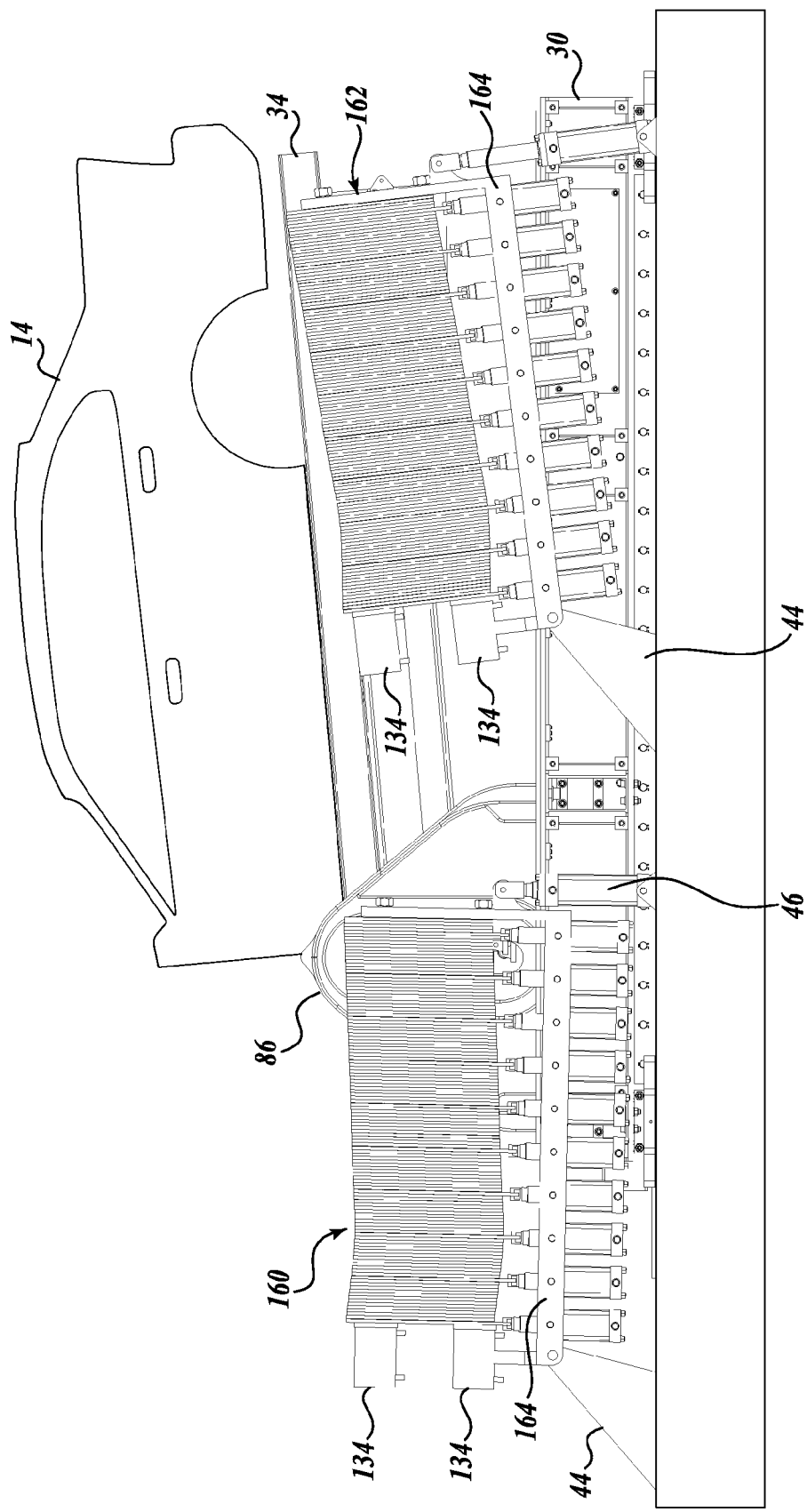

CRASH TEST METHOD AND APPARATUS INCLUDING PITCH SIMULATION

BACKGROUND

This invention relates to systems and methods in which the dynamic conditions attendant a vehicle crash are simulated in order to evaluate cabin design and vehicle safety systems, such as occupant restraint devices. More specifically, the present invention relates to non-destructive crash tests that include the simulation of vehicle pitch (crash-related fore and aft vehicle rotation).

To evaluate vehicle crash worthiness and occupant safety, vehicle manufacturers and regulatory agencies conduct full-scale crash tests in which a vehicle is caused to collide with an obstacle in a manner that duplicates a real world collision. Sensors, located on the vehicle and/or crash test dummies that are placed in the vehicle, provide data that is recorded for analysis and evaluation.

Full-scale crash testing is expensive because it destroys the test vehicle, which in some cases is an expensive prototype or an early stage production unit of limited availability. The expense and the possible lack of additional test vehicles limit the amount of full-scale crash tests that can be conducted, thereby impeding necessary analyses, including the design, development, and ongoing product testing of vehicle safety systems, such as occupant restraint systems and the design of vehicle interiors from the standpoint of occupant safety.

The need for less expensive and readily available crash tests has led to the development of non-destructive crash test arrangements in which vehicle deceleration is recorded during a full-scale crash test. This deceleration data, which is often referred to as a crash pulse, is used to control either the deceleration or acceleration of a crash sled in a manner that substantially matches the crash pulse. In such an arrangement, all or a portion of the occupant compartment of the vehicle, often referred to as a vehicle buck, is mounted on the upper surface of the crash sled. Instrumented crash test dummies occupy the vehicle buck during the deceleration or acceleration of the test buck. The instrumented dummies provide data that can be evaluated to indicate the kind and degree of occupant injury that might result from the simulated crash and/or be evaluated to determine compliance with crash safety limitations pertaining to occupant head and chest acceleration and various loads and forces that can be experienced by a human occupant during a crash event.

Current crash sled systems provide relatively accurate results with respect to replicating crash event acceleration along an axial direction that corresponds to the vehicle travel path at the time of a crash. However, most systems cannot simulate dynamic conditions, such as vehicle pitch, that can occur during a crash. Vehicle pitch occurs, for example, in frontal and rear impact crashes in which the front of the vehicle is often abruptly thrust downwardly and the rear of the vehicle is thrust upwardly. The accelerations associated with this downward and upward motion can be significant enough to cause or contribute to occupant injury.

The prior art includes various attempts to provide a crash sled system that replicates both vehicle pitching motion and the axial (substantially horizontal) deceleration that is experienced during an actual crash event. One such attempt is disclosed in U.S. Patent Application Publication No. 2010/0288013, which discloses a conventionally configured crash sled having an auxiliary platform that is located above the crash sled upper surface. A support member, hinged to the crash sled and the auxiliary platform, permits positioning of the auxiliary platform above the crash sled upper surface and permits tilting (pitching) of the auxiliary platform relative to the crash test surface. Elevation of the forward and rear ends of the auxiliary platform is controlled by hydraulic or pneumatic actuators that are mounted on the crash sled and include extendable actuator rods that are mechanically linked to the auxiliary platform front and rear ends. In operation, pressure is established in the actuators that is sufficient to rapidly upwardly accelerate the ends of the auxiliary platform. A braking system interacts with the extendable actuator rods to control movement of the front and rear ends of the auxiliary platform so that the pitching motion of the auxiliary platform replicates the vehicle pitching experienced during an actual crash.

U.S. Patent Application Publication No. 2004/0230934 also discloses crash sled arrangements that include simulation of vehicle pitch that is incident to a vehicle crash. U.S. Patent Application Publication No. 2004/0230934 discloses arrangements similar to the crash sled of U.S. Patent Application Publication No. 2010/0288013 in that an auxiliary platform that is located above the crash sled and actuators for controlling the pitch of the auxiliary platform are located "on-board" the crash sled. The primary differences between the arrangement of U.S. Patent Application Publication Nos. 2010/0288013 and 2004/0230394 are the nature of the actuators that control pitch of the auxiliary platform and the manner in which the actuators operate. More specifically, in U.S. Patent Application Publication No. 2004/0230394, the actuators extend in the vertical direction from the upper surface of the crash sled and the front and rear ends of the auxiliary platform. In operation, the actuators are independently controlled with auxiliary platform pitch determined by the difference between the vertical forces being asserted by the actuators.

German Patent Application No. 10118682 also discloses a pitch simulation arrangement that includes an auxiliary platform mounted for movement with a conventional crash sled. German Patent Application No. 10118682 differs from the noted U.S. Patent Application Publications in that the actuators that control movement (pitching) of the auxiliary platform are not located on the crash sled. Instead, the actuators are mounted between the floor or foundation on which the crash sled rests and guidance rails that extend along each side of the crash sled. During the simulation, the forward and aft ends of the auxiliary platform are engaged with the guidance rails and the actuators are dynamically driven to control pitching of the auxiliary platform.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is a crash sled system configured for concurrent simulation of the deceleration and the pitching motion associated with vehicle crashes. Each embodiment of the invention includes a main sled that is catapulted along a set of rails or other track to simulate a vehicle crash pulse. A pitching platform is mounted on the main sled. During the simulation procedure, the fore and aft ends of the pitching platform travel along and pass from front and rear guide assemblies that are mounted above the foundation or other base structure that supports the overall crash system.

In each embodiment of the invention, the guide paths established by the front and rear guide assemblies are based on approximations to vehicle pitch angle versus time characteristics experienced by vehicles during the crash event being simulated.

In a first embodiment of the invention, the front guide assemblies establish straight line travel paths and are set to predetermined angles of inclination prior to initiating the simulation procedure. In particular, the front guide assemblies are inclined so that the straight travel paths defined by the assemblies correspond to a linear approximation of the path that need be followed by the forward end of the pitching platform in order to simulate the pitching motion of a crash event. Likewise, the inclination angle of the rear guide assemblies are set so that travel paths defined by the rear guide assemblies correspond to a linear approximation of the path that need be followed by the aft end of the pitching platform in order to simulate the pitching motion of a crash event.

If desired or necessary, simulation accuracy of the first embodiment may be increased by front and rear guide assemblies that define smoothly curved pathways (e.g., a parabolic approximation) to data that corresponds to a particular crash of a specific vehicle or data that corresponds to crash events of a number of vehicle types or models. Further, the first embodiment of the invention can be augmented with linear actuators that move the forward and aft ends of the front and rear guide assemblies upwardly and downwardly during the simulation process to provide pitching motion that more closely matches motion that occurred during a vehicle crash.

A second embodiment of the invention that can be used over a broader range of pitching simulation with greater preciseness employs front and rear guide assemblies in which the pathways traveled by the front and rear ends of the pitching platform exhibit compound curvature and/or a relatively high degree of curvature. One aspect of the second embodiment is the use of machined inserts that are installed in the front and rear guide assemblies. The inserts are contoured to cause the front and rear of the pitching platform to deviate from straight line travel in a way that closely simulates pitching of a particular crash event or simulates pitching for a particular vehicle type or model.

The third and fourth embodiments of the invention include front and rear guide assemblies in which the pathways traveled by the front and rear ends of the pitching platform are adjustable. In these embodiments, each front and rear guide assembly includes an assemblage of movable metal plates that establishes the contour of a flexible metal strip that guides a corner of the pitching platform when the main sled and pitching platform are launched.

Significant features of the second, third, and fourth embodiments include A-frame assemblies that couple the forward end of the pitching platform to the front guide assemblies. The A-frame assemblies couple the forward acceleration of the main sled to the pitching platform while allowing the pitching platform to freely travel along the front guide assemblies during the simulation process.

In accordance with other aspects of the invention, braking mechanisms are provided to eliminate rotation of the pitching platform when the simulation sequence has been completed, i.e., when the travel path of the pitching platform is no longer controlled by the front and rear guide assemblies.

Other aspects of the invention include an arrangement that applies a braking force to prevent or minimize damage if a malfunction or emergency results in abruptly stopping the main sled.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7 and 8 depict the forward end of the embodiment of the invention shown in FIG. 6, illustrating the manner in which the forward end of the pitching platform is joined to the crash sled;

FIGS. 9 and 10 depict an example of a guide assembly for use in the embodiment of the invention that is shown in FIG. 6;

FIG. 12 depicts a portion of one of the A-frames located at the forward end of the embodiment of FIG. 6, illustrating a braking arrangement that prevents damage to the crash sled in the event a malfunction abruptly interrupts forward sled travel;

FIG. 13 depicts a third embodiment of the invention in which the front and rear guide assemblies can be adjusted during a pre-launch procedure to establish contoured pathways for precise simulation of vehicle pitching motion;

FIG. 14 is an isometric view depicting the structural configuration of the front guide assembly of the embodiment shown in FIG. 13;

FIG. 18 depicts a fourth embodiment of the invention in which the front and rear guide assemblies can be adjusted during a pre-launch procedure to establish contoured passageways for precise simulation of vehicle pitching motion;

DETAILED DESCRIPTION

Figure 1:
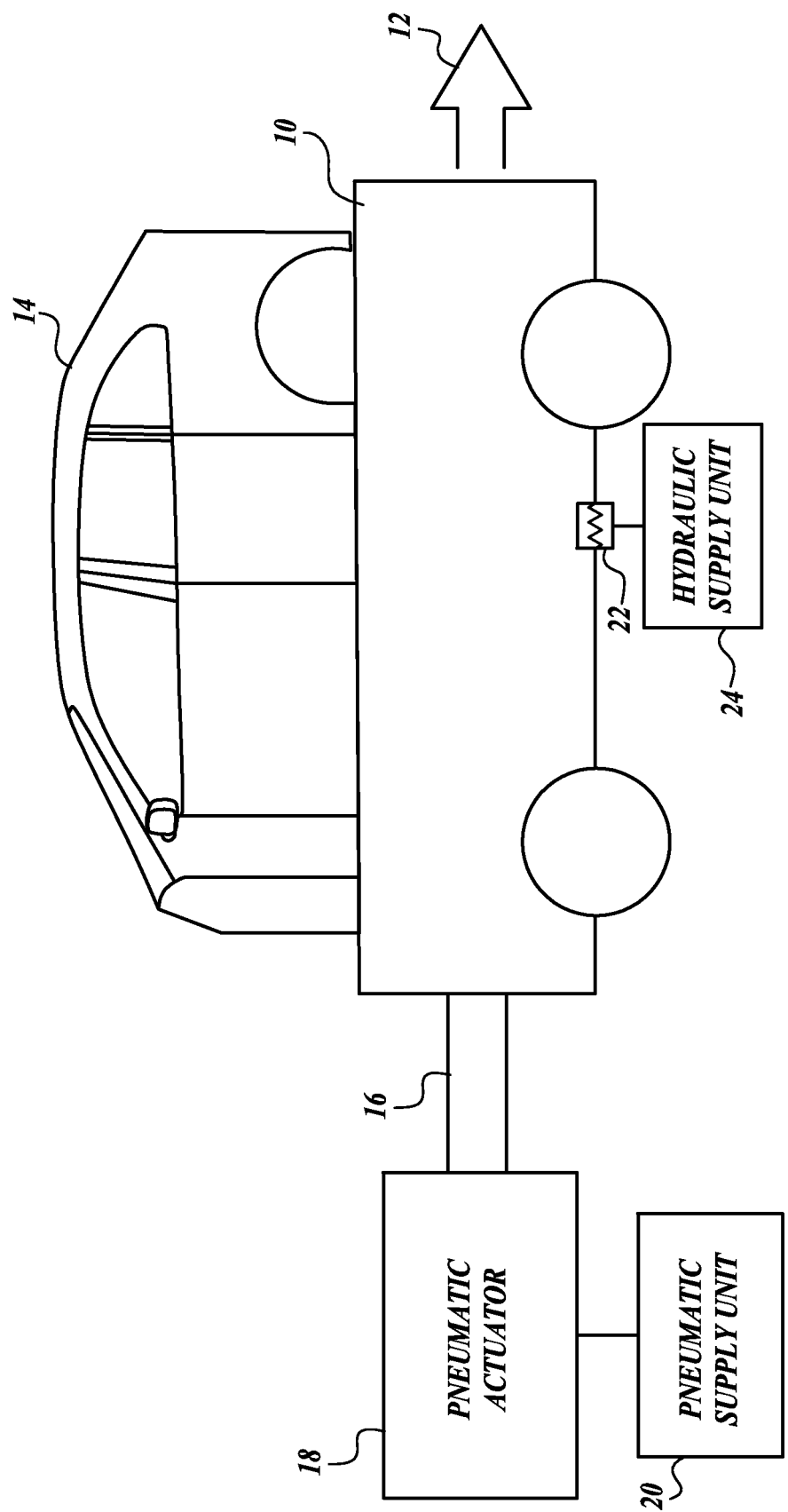
FIG. 1 is a schematic view of a type of prior art crash test system that can advantageously incorporate the present invention.

FIG. 1 illustrates the basic components of a reverse acceleration crash sled system, which is a type of system that can advantageously employ the present invention. In the depicted arrangement, a crash sled 10 is configured for traveling in the direction of arrow 12 along a set of rails (not shown in FIG. 1). Mounted to the upper surface of crash sled 10 is the occupant compartment 14 of a particular vehicle or type of vehicle. Prior to initiating operation of the system, crash sled 10 is positioned against the end of the piston 16 of a high-pressure pneumatic actuator 18. A pneumatic supply unit 20 increases the internal pressure of pneumatic actuator 18 to the level at which piston 16 can be driven with enough force to accelerate crash sled 10 to at least the maximum acceleration of the crash pulse being replicated. The force asserted by piston 16 is opposed by operation of hydraulically-operated friction brakes 22 that are mounted between the lower surface of crash sled 10 and the track or rails on which it travels. The friction brakes 22 are actuated with sufficient clamping force to prevent any motion of the crash sled 10 until the simulation is initiated.

To initiate the simulation procedure, a control computer (not shown in FIG. 1) causes hydraulically operated friction brakes 22 to release piston 16 so as to assert a force on the crash sled that rapidly accelerates crash sled 10 in the axial direction indicated by arrow 12 (horizontal in FIG. 1). The force asserted by piston 16 is opposed by real-time operation of hydraulically operated friction brakes 22. Specifically, servo-controlled valves that are located in a hydraulic supply unit 24 are activated by the control computer to apply a braking force that causes the acceleration of crash sled 10 to closely match a desired crash pulse. Typically, during simulation of the crash pulse, the control computer operates the servo valves as a closed-loop feedback system in which the error signal is the difference between the desired crash pulse and measured acceleration of crash sled 10. Once the simulation is complete, crash sled 10 continues to move along the track or rails until brought to a stop by a separate set of computer-controlled brakes (not shown).

Figure 2:
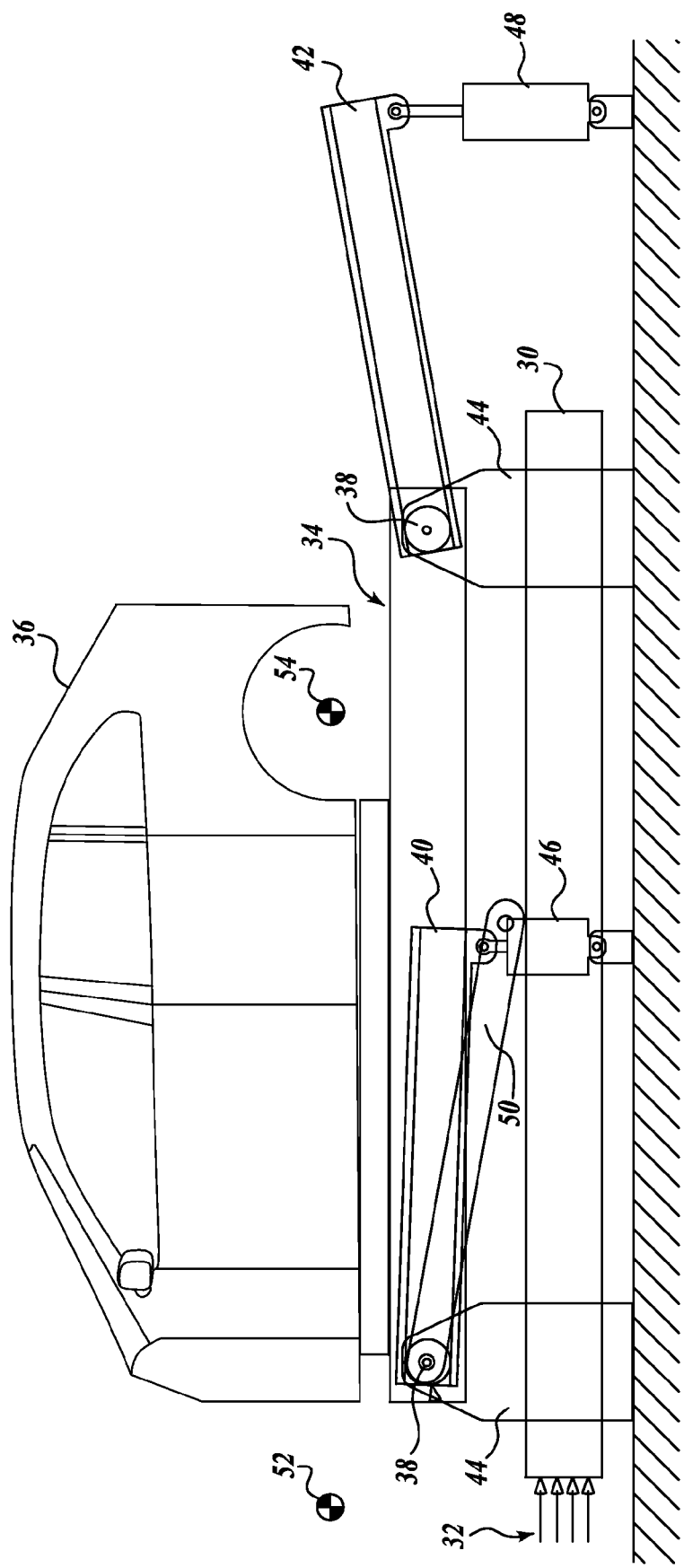
FIG. 2 schematically depicts a first embodiment of the invention in which front and rear guide assemblies define straight line or gently curved pathways that control the vertical trajectory followed by the forward and aft ends of a pitching platform so as to provide simulated vehicle pitching while the crash sled is being operated to simulate vehicle acceleration associated with an acceleration pulse.

FIG. 2 depicts a first embodiment of the invention configured to add pitch simulation to a crash sled system such as the arrangement of FIG. 1. In FIG. 2, a main sled 30 that is structurally and operationally equivalent to crash sled 10 of FIG. 1 is positioned on a set of rails or other track (not shown). When launched, main sled 30 (which is shown in its pre-launch condition) is subjected to an acceleration force 32 sufficient to replicate a desired crash pulse and, hence, simulate a vehicle crash.

A pitching platform 34 is located above the upper surface of main sled 30. An occupant compartment 36 representative of the type of vehicle under consideration (or other payload) is securely mounted to the upper surface of pitching platform 34. Extending outwardly away from each corner of pitching platform 34 is a guide member 38. The guide members 38 at the front of the pitching platform 34 pass into or are otherwise supported at the forward end of front guide assemblies 40, and the guide members 38 at the aft end of pitching platform 34 pass into or are otherwise supported at the forward end of rear guide assemblies 42. Front and rear guide assemblies 40 and 42 control the trajectory (and, hence, pitch) of pitching platform 34 when main sled 30 is launched to replicate a desired acceleration pulse. That is, concurrent with movement of main sled 30 in the direction of arrow 12, the forward end of pitching platform 34 moves both rearwardly and vertically along a guide path established by front guide assemblies 40 and the aft end of pitching platform 34 moves both rearwardly and vertically along a guide path established by rear guide assemblies 42. To facilitate movement along the front and rear guide assemblies, guide members 38 may include or be formed as rollers or may be configured to simply slide along the paths established by the front and rear guide assemblies.

In the arrangement of FIG. 2, the forward ends of front and rear guide assemblies 40 and 42 are positioned above the upper surface of main sled 30 by vertical support members 44. Bearings or equivalent devices included in the support members allow the front and rear guide assemblies 40 and 42 to be swung upwardly and downwardly relative to the associated support columns 44. As is also shown in FIG. 2, the elevation of the aft end of each front guide assembly 40 is established by a vertically extending linear actuator 46 that is pivotably mounted to the aft end of the front guide assembly 40 and is pivotably mounted to the foundation or base structure on which the simulated crash test is conducted. In a like manner, the elevation of the aft end of each rear guide assembly 42 is established by a vertically extending linear actuator 48 that is pivotably mounted to the forward end of the front guide assembly 40 and pivotably mounted to the foundation (base structure) that supports the system.

Various types of actuators can be employed as linear actuators 46 and 48. However, electromechanical or hydraulic linear actuators are currently preferred over manually operated jackscrews to thereby allow the aft ends of forward guide assemblies 40 (and the aft ends of rear guide assemblies 42) to be swung in unison by the system computer and set at desired inclinations during the pre-launch procedure. Preferably, sensors (not shown in FIG. 2) are either included in or are mounted near linear actuators 46 and 48. The sensors indicate the amount of travel of the aft ends of guide assemblies 40 and 42 and thus, the pre-launch inclination of guide assemblies 40 and 42.

Spaced-apart link arms 50 extend angularly downward from the forward end of pitching platform 34 to main sled 30 with the upper end of link arms 50 being pivotally attached to pitching platform 34 and the lower end being pivotably attached to main sled 30. Link arms 50 cause pitching platform 34 to travel with main sled 30 as the main sled is catapulted along the rails or track that guide main sled 30.

Figure 3:
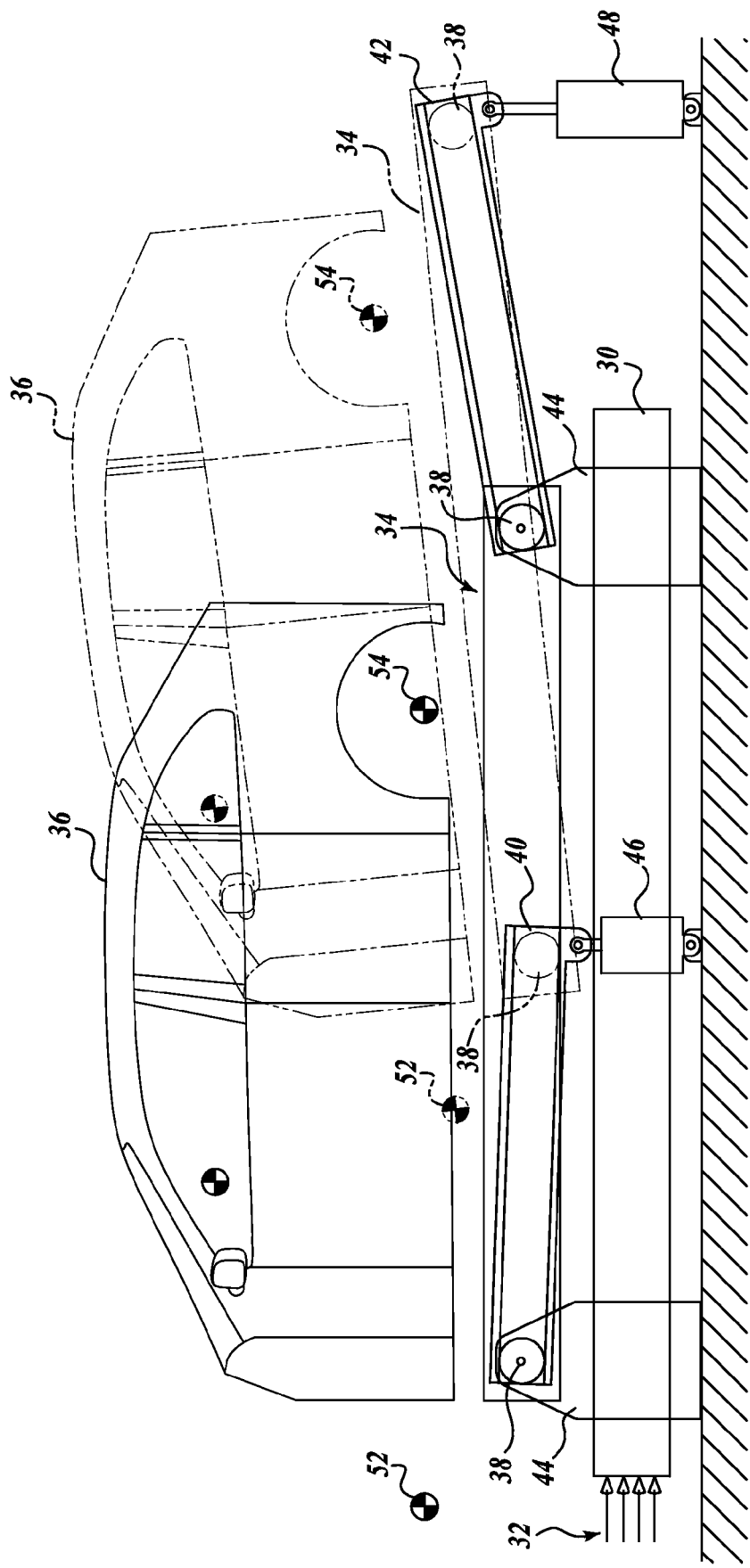
FIG. 3 shows the position of the pitching platform and an associated test portion of a vehicle during movement of the pitching platform that occurs during operation of the invention.

As is indicated in FIG. 3, movement of the main crash sled 30 and pitching platform 34 during the simulation of a vehicle crash causes pitching platform 34 to follow a path that is dictated by front and rear guide assemblies 40 and 42. In that regard, FIG. 3 depicts the condition of pitching platform 34 both before and after the pitching platform and main sled 30 have traveled a distance sufficient for simulating the vehicle pitching motion associated with the vehicle crash that is being replicated. During that period of travel, the guide members 38 at the front of the pitching platform are constrained to follow the guide paths of front guide assemblies 40, and guide members 38 at the rear of the pitching platform are constrained to follow the guide paths of rear guide assemblies 42.

Simulating pitch in the described manner relies entirely on the guide paths established by the front and rear guide assemblies 40 and 42 and the guide assembly inclination angles. That is, during the simulation process, acceleration force 32 causes acceleration of main sled 30. As main sled accelerates, pitching platform guide members 38 are constrained to follow the guide paths of front and rear guide assemblies 40 and 42. The only forces that act on the pitching platform are the forward acceleration force 32 and the forces caused by reaction between the guide members of the pitching platform and the guide paths of the front and rear guide assemblies.

The concept of pitch simulation using only the force that accelerates the crash sled was shown to be feasible by analyzing data acquired during full-scale crashes (e.g., barrier crashes) of various vehicles. Specifically, photometric analysis of high-speed video recordings of crash events was used to determine the paths (position versus time) followed by two longitudinally separated locations on the vehicles (the front and rear axles were used). The data representing the paths followed by the two reference locations were used to determine data representing vehicle pitch angle versus time. The vehicle pitch angle data was then transformed to provide data representing the paths that need be followed by the forward and aft ends of a pitching platform (of given size) in order to simulate the vehicle pitching. Transforming the pitch data to provide data representing the paths for the ends of the pitching platform can be accomplished by determining the change in vehicle pitch for selected increments of time and determining the paths defined by corresponding rotations of the pitching platform forward and aft ends.

When the above analyses were carried out with respect to various vehicles, it was found that satisfactory simulation of vehicle pitching can generally be accomplished without requiring complex movement of the forward and aft ends of a pitching platform. Specifically, it was found that the guide paths of the front and rear guide assemblies (40 and 42 in FIGS. 2 and 3), which control the movement of the ends of the pitching platform, can often be straight lines or gentle (shallow) curves.

With regard to a specific example, during development of the invention, data that represented frontal impact crashes of a number of vehicles having wheelbases of approximately 103 inches (2.61 meters) was analyzed using the above procedure. In that situation, a pitching platform (34 in FIGS. 2 and 3) having an overall length of 118 inches (3 meters) was considered, and it was determined the pitching platform would travel a horizontal distance of approximately 57 inches (1.45 meters) in order to simulate the observed vehicle pitching motion. Observation of the data representing the required travel paths for the forward and aft ends of the pitching platform revealed a generally linear relationship between vertical and horizontal movement of the pitching platform for both ends of the pitching platform. Further analysis (least-squares curve fitting) revealed that the use of front and rear guide assemblies having linear guide paths could closely approximate the required travel paths for the forward and aft ends of the pitching platform. Thus, it was found that acceptable simulation of the pitching motion that occurs in vehicle crashes can be accomplished with the arrangement depicted in FIG. 2.

It should be recognized that the invention does not require recording and using data that represents the paths followed by two or more locations on the vehicles when the crashes occurred. For example, the crashed vehicles can be instrumented to measure and record vehicle pitch angle versus time during each of the crash events. Directly recording pitch angle eliminates the above discussed step of determining vehicle pitch angle based on paths followed by two longitudinally separated locations during the vehicle crash event. It also should be recognized that the invention is not limited to using least-squares analyses. Other regression analyses of empirical crash test data can be employed. The important thing is using empirically derived approximations to the paths that must be followed by the fore and aft ends of a pitching platform in order to simulate the vehicle pitching motion.

In some situations, linear approximations to the required guide paths may not provide a desired degree of simulation accuracy. In such situations, either parametric or non-parametric regression analyses can be used to develop appropriate travel paths for the forward and aft ends of pitching platform 34. Where the travel paths are relatively smooth (e.g., shallow parabolic curves), the arrangement of FIG. 2 provides satisfactory performance. Further, hereinafter disclosed more complex embodiments of the invention may be used if extremely precise simulation is required and/or the required travel paths are complex (e.g., multiple inflection points or substantial curvature).

Turning to the operation of the arrangement of FIG. 2, linear actuator 46 is adjusted prior to conducting a crash test so that the downward slope (inclination) of front guide assembly 40 corresponds to the slope of a straight line approximation to the path to be followed by the forward end of pitching platform 34. In a similar fashion, linear actuator 48 is set so that the upward slope (inclination) of rear guide 42 corresponds to the slope of a straight line approximation to the path to be followed by the aft end of pitching platform 34. Linear actuators 46 and 48 are then locked in place so that forward and rear guide assemblies are fixed in place during simulation of a crash pulse and attendant vehicle pitching.

Figure 4:
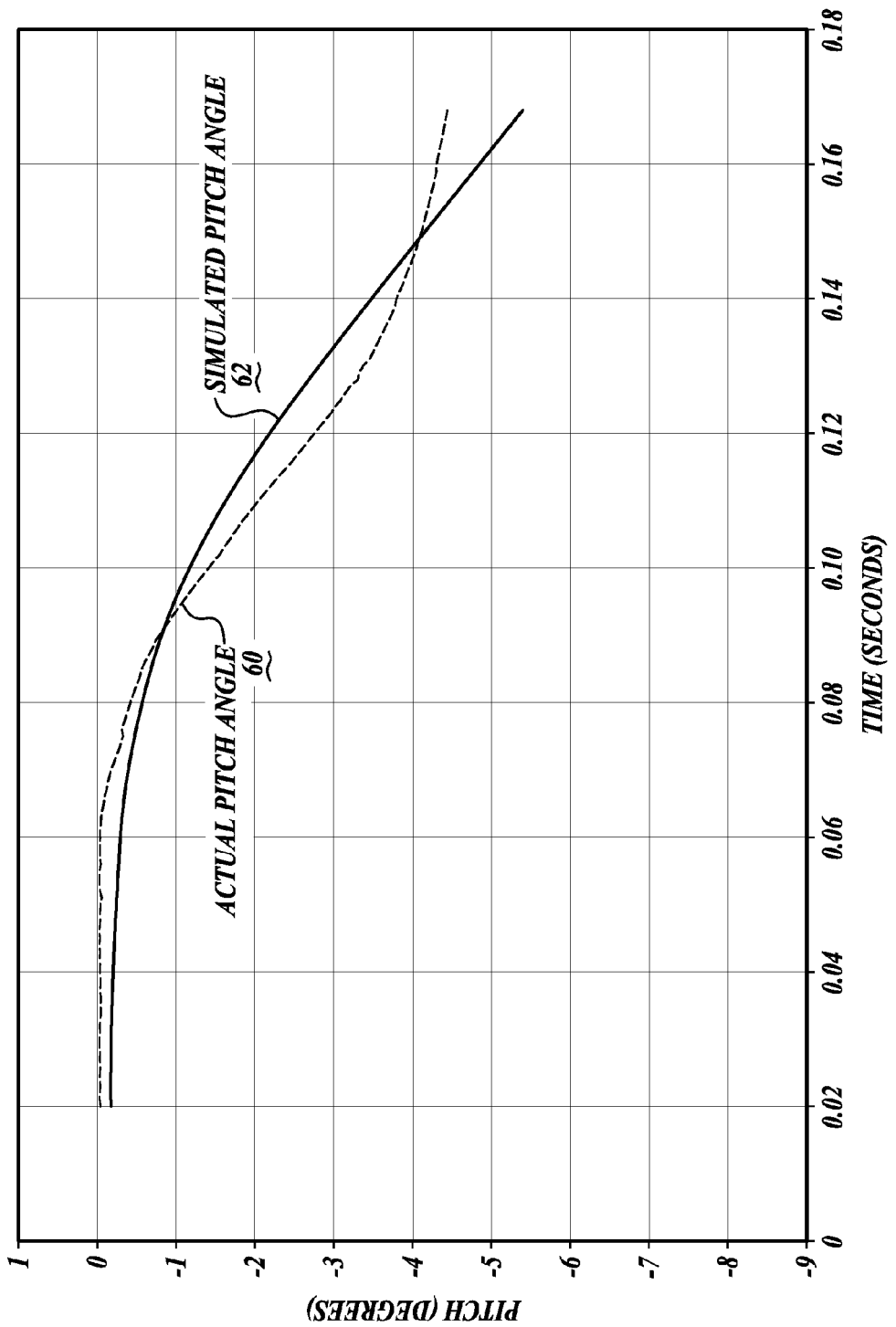
FIG. 4 graphically depicts exemplary deviation between actual pitching motion that occurs during a vehicle crash and the simulation of that pitching event achieved by the arrangement of FIG. 2 in which the front and rear guide assemblies form straight line travel paths for the forward and aft ends of the pitching platform.

FIG. 4 graphically depicts an example of using linear guide paths to simulate pitching that occurred in a vehicle crash. FIG. 4 illustrates the pitch angle 60 experienced during a particular set of vehicle crashes (as a function of time). Also shown in FIG. 4 is the simulated pitch angle 62 that would result from using forward and rear guide assemblies 40 and 42 that define straight line guide paths determined by linear approximations based on the paths followed by the front and rear axles during the vehicle crash. The relationship between the actual and simulated pitch angles in FIG. 4 is typical with respect to using least-squares line or other empirically derived approximations to determine the travel path of pitching platform 34. Specifically, the error between the actual and simulated pitch angles varies with time, crossing over between negative and positive values near the midpoint and the end of the simulation.

Figure 5:
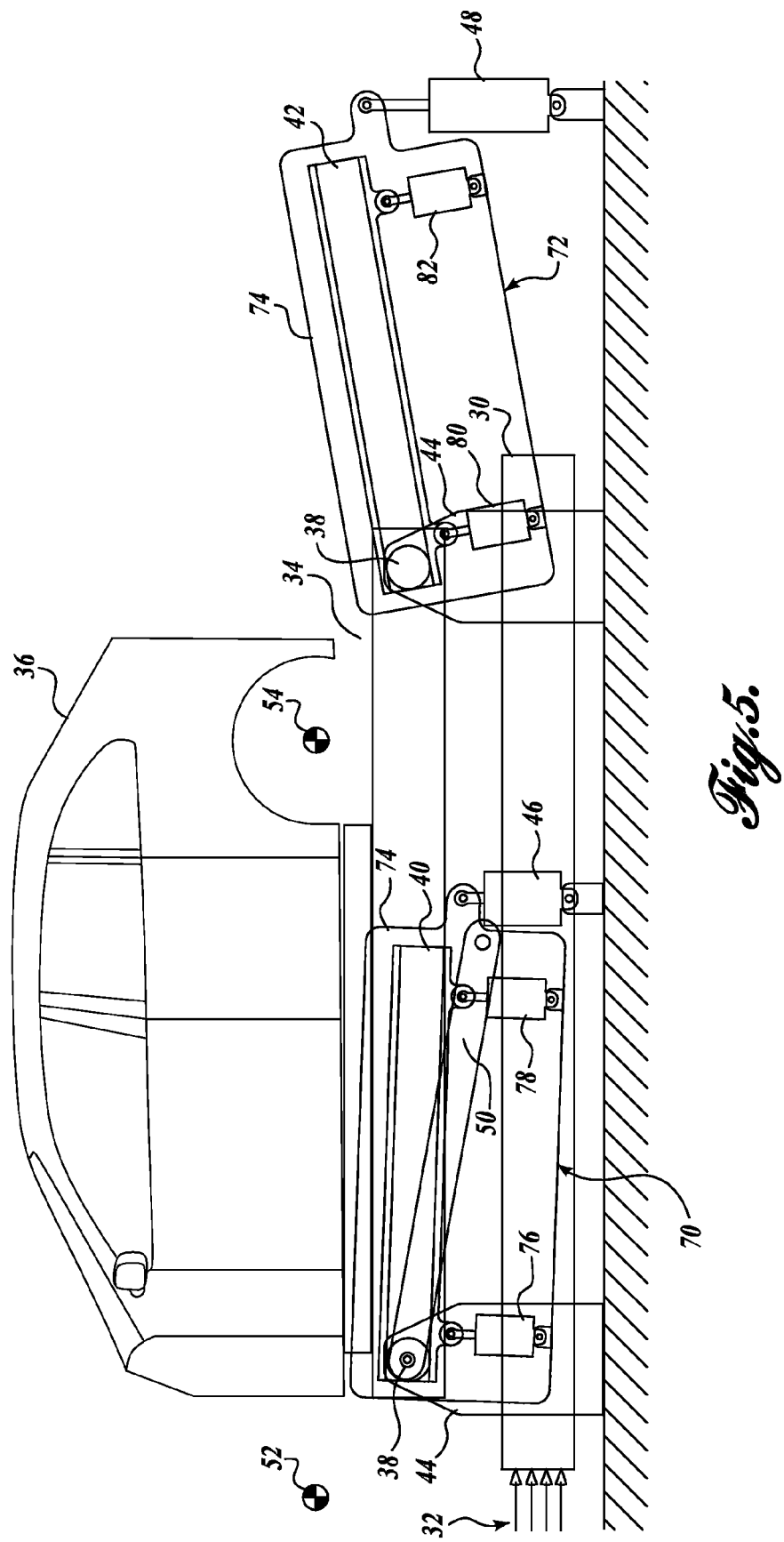
FIG. 5 schematically depicts an embodiment of the invention in which the arrangement of FIG. 2 is augmented with actuators that are attached to the front and rear guide assemblies to provide more precise simulation of vehicle pitch that occurs during a crash.

Various changes and modifications can be made to improve simulation accuracy of the above-discussed arrangement of FIG. 2. For example, the arrangement of the invention described in FIG. 2 can be augmented with actuators that operate to decrease or eliminate the deviations between actual pitch and pitch simulation that occur when the simulation is based on linear pitching approximations. FIG. 5 depicts such an augmented embodiment, with the system being shown in the pre-launch position and with components common to the arrangement of FIGS. 2 and 3 being identified by the reference numerals used in FIGS. 2 and 3.

In the arrangement of FIG. 5, each front guide assembly 40 shown and described relative to the arrangement of FIG. 2 is a component of a front pitching assembly 70, and each rear guide assembly 42 is a component of a rear pitching assembly 72. Front and rear pitching assemblies 70 and 72 include positioning plates 74 that extend downwardly along an associated support column 44 and rearwardly to positions that are aft of the end of guide assemblies 40 and 42. In this arrangement, linear actuator 46 is attached to and controls the elevation of the aft end of front positioning plates 74. Similarly, linear actuator 48 is attached to and controls the elevation of the aft end of rear positioning plates 74.

Actuators 46 and 48 operate in the manner described relative to FIGS. 2 and 3 to establish the elevation of the aft ends of guide assemblies 40 and 42 and thereby establish inclined paths that are followed by the front and rear ends of pitching platform 34 when main sled 30 and pitching platform 34 are launched to simulate both the vehicle axial acceleration and vehicle pitch.

As shown in FIG. 5, front pitching assembly 70 includes a linear actuator 76 having one end pivotably mounted to the forward end of guide assembly 40 and the second end pivotably mounted to a flange or other suitable feature at the lower edge of front positioning plate 74. A linear actuator 78 is located near the aft end of forward guide assembly 40, with the upper end of the actuator pivotably mounted to guide assembly 40 and the lower end pivotably mounted at or near the lower edge of positioning plate 74.

Rear pitching assembly 72 is configured in substantially the same manner as forward pitching assembly 70. Specifically, rear pitching assembly 72 includes a linear actuator 80 that is pivotably attached at the forward end of rear guide assembly 42 with the other end of the actuator being rotatably attached to a flange or other suitable feature on the lower edge of the rear positioning plate 74. An additional linear actuator 82 is pivotably connected between the aft end of rear guide assembly 42 and the lower edge of rear positioning plate 74.

In view of this arrangement, it can be recognized that the pre-launch positions of front guide assemblies 40 are established by the initial settings of linear actuators 76 and 78 in combination with the setting of linear actuator 46, and the pre-launch position of rear guide assemblies 42 are established by the initial settings of linear actuators 80 and 82 in combination with the setting of linear actuator 48. As is the case with respect to the arrangement of FIGS. 2 and 3, the pre-launch positions of the front and rear guide assemblies 40 and 42 are set to establish travel paths that correspond to linear approximations to vehicle pitching experienced during one or more actual crashes.

If the pre-launch settings of linear actuators 76-82 are not varied while simulation of a crash is underway (i.e., while main sled 30 and pitching platform 34 are being axially accelerated), the arrangement of FIG. 5 will provide no advance over the arrangement of FIG. 2. However, during the simulation period, linear actuators 76-82 are controlled by the system control computer to move the forward and aft ends of guide assemblies 40 and 42 upwardly and downwardly in a manner that causes the simulated pitching motion to closely match the motion that occurred during the vehicle crash that is being simulated.

Various techniques can be used to control linear actuators 76-82 to achieve relatively precise pitching simulation. For example, a launch can be conducted with the front and rear guide assemblies 40 and 42 set in accordance with linear approximations to the pitching motion being simulated. The simulation error that occurs during the launch can be determined and be processed to provide corrective control signals for actuators 76 and 78 of front pitching assembly 70 and/or actuators 81 and 82 of rear pitching assembly 72. If necessary, the process can be repeated to provide improved corrective control signals that further reduce the simulation error. By way of additional example, real-time error correction may be used in which one or more of actuators 76-82 operate in an iterative closed-loop feedback arrangement in which the error signal of the feedback system is the difference between the pitching motion being simulated and the actual pitch of pitching platform 34.

In addition and as previously mentioned, operational accuracy of the arrangement of FIG. 2 can also be improved by using forward and/or rear guide assemblies 40 and 42 having smoothly curved, rather than straight guide paths. As noted, higher-order empirically derived approximations, such as least-squares fitted parabolic (second-degree quadratic) approximations, can be utilized to determine smoothly curved guide paths.

Figure 6:
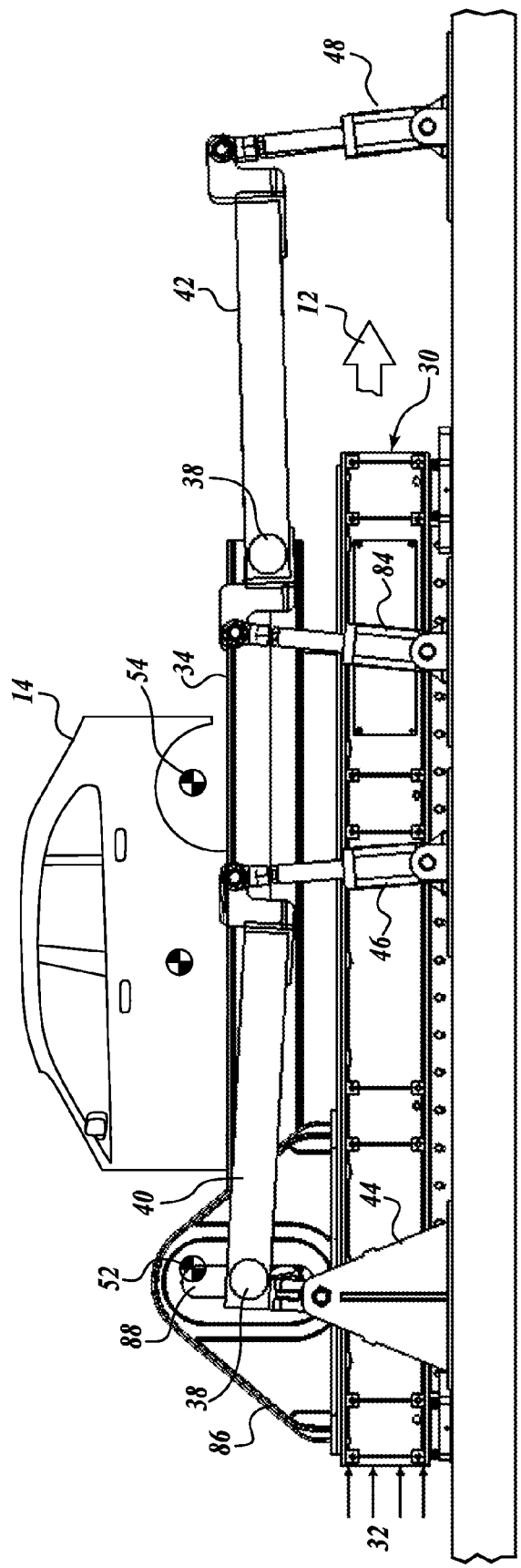
FIG. 6 illustrates an embodiment of the invention which can accommodate guide assemblies in which the pathways can be either linear or exhibit compound curvature and/or a relatively high degree of curvature in order to simulate vehicle pitching motion with a degree of accuracy exceeding that of the arrangement of FIG. 2.

FIG. 6 depicts an embodiment of the invention that is generally capable of more precise pitching simulation than the embodiment of FIG. 2. Specifically, in the embodiment of FIG. 6, the guide paths of guide assemblies 40 and 42 can be configured to exhibit compound curvature and/or a relatively high degree of curvature—as well as being the straight and smoothly curved pathways described relative to the arrangement of FIG. 2.

The degree of guide path curvature that can be employed with the arrangement of FIG. 2 is limited in large part because the application of high-acceleration forces to main sled 30 can cause substantial force to be exerted directly on the forward ends of guide assemblies 40 via link arms 50. In instances in which the guide paths of the guide assemblies are of compound curvature (e.g., undulating) or are of relatively high curvature, the force exerted on the forward ends of the guide assemblies can be great enough to inhibit the guide members from freely passing along the guide paths.

Comparing FIGS. 2 and 6, it can be seen that the depicted arrangements differ with respect to the manner in which the forward ends of rear guide assemblies 42 are supported. Specifically, FIG. 6 depicts an alternative support arrangement in which actuators 84 that are located alongside and near the aft end of main sled 30 are substituted for the support columns 44 of FIG. 2. Linear actuators 84 of FIG. 6 are mounted in the same manner as linear actuators 46 and 48 of FIG. 2, being pivotably mounted to the forward end of guide assembly 42 and to the foundation or other base structure that supports the system. Sensors (not shown in FIG. 6) are either included in or are mounted near linear actuators 84 to indicate the elevation of the forward ends of rear guide assemblies 42. As was described relative to the linear actuators of FIG. 2, electromechanical or hydraulic linear actuators are currently preferred over manual jackscrews to allow the forward ends of rear guide assemblies 42 to be moved upwardly in unison by the system control computer.

As shown in FIG. 6, the aft ends of rear guide assemblies 42 are supported in the same manner as was described relative to the arrangement of FIG. 2. Specifically, located at the aft end of the rear guide assemblies 42 is a pair of downwardly extending linear actuators 48, each having the lower end thereof pivotably attached to the foundation or test sled base structure. In FIG. 6, linear actuators 48 are located directly aft of linear actuators 84 and are spaced apart from one another by the same distance as the spacing between linear actuators 84. Thus, rear guide assemblies 42 are parallel to one another and establish the path along which the aft end of pitching platform 34 travels during simulation of a desired acceleration pulse. Structurally and functionally, the combination of linear actuators 48 and 84 corresponds to the combination of support columns 44 and actuators 48 in the arrangement of FIG. 2, allowing the slope between the forward and aft end of rear guide assemblies 42 to be set at a desired value and locked into place prior to conducting a crash test.

With continued reference to FIG. 6, the aft ends of forward guide assemblies 40 are positioned above the upper surface of main sled 30 in the same manner as was described relative to the arrangement of FIG. 2. However, a significant difference exists as to the interconnection between the main sled assembly 30 and pitching platform 34. In the arrangement of FIG. 6, the end of each forward guide assembly includes a downwardly extending pivot arm that is pivotably attached to the upper end of support column 44. Located along each forward edge of main sled 30 in FIG. 6 is a vertically extending A-frame assembly 86. Located in the central portion of each A-frame assembly is a vertical slot 88. The guide members 38 pass outwardly through the vertical slots 88 and into the front guide assemblies 40 to establish the pre-launch position of the forward end of the pitching platform. The A-frame assemblies 86 impose the acceleration force of the main sled 30 to the pitching platform 34 while allowing the front guide members 38 to travel up and down as required to simulate the pitching motion on the forward end of the test article 14.

FIGS. 7 and 8 depict the forward end of main sled 30 and pitching platform 34. In both figures, forward guide assemblies 40 are not shown in order to illustrate the manner in which the guide members 38 are retained in vertical slots 88 of A-frames 86. As can be seen in both FIGS. 7 and 8, guide member 38 is retained in slot 88 by a slider block 90 that is dimensioned to allow the slider block and forward end of the pitching platform to move upwardly and downwardly relative to slot 88.

FIGS. 9 and 10 depict the currently preferred method of implementing significantly curved and compound curved pathways within the guide assemblies employed in the arrangement of FIG. 6. Shown in FIGS. 9 and 10 is a forward guide assembly 40 that includes a longitudinally extending beam 92. Plates 94 that are joined to the top and bottom of beam 92 project outwardly from a broad face of beam 92. Machined inserts 96 that are contoured to define the pathways to be followed by pitching platform 34 are secured to the plates 94 by fasteners 98. With respect to contouring of the inserts, it should be noted that the inserts 96 can be machined for simulated pitching of a particular crash event (particular crash of a specific vehicle) or simulated pitching for a group of vehicles (e.g., particular vehicle models or types of vehicle).

An embodiment of the invention that includes specifically contoured guide assemblies is operated in the same basic manner as the embodiment described with respect to FIGS. 2 and 6. Specifically, during the pre-launch procedure, the guide assemblies are set to correspond to a linear approximation that provides the best fit to the pitching motion that is to be simulated. When the crash sled is launched, the contoured passageways alter the movement of pitching platform 34 to obtain more precise pitching simulation than would be obtained with straight line or gently curved guide assemblies.

Crash sleds arranged in accordance with the invention acquire substantial momentum during the simulation of a vehicle crash. Thus, like the prior art arrangement of FIG. 1, main sled 30 and pitching platform 34 and its payload continue to move axially after completion of the simulation until they are brought to a stop. In each embodiment of the invention, the front and rear guide assemblies 40 and 42 are secured to the base structure that supports the overall system, rather than being mounted on-board the main sled 30. Thus, upon conclusion of the simulation, guide members 38 at the forward end of pitching platform 34 pass from and are no longer guided or constrained by forward guide assemblies 40. Likewise, guide members 38 at the aft end of pitching platform 34 pass from and are no longer guided or constrained by rear guide assemblies 42.

As a result of the path followed during the vehicle pitching simulation, rotational inertia will be acting on pitching platform 34 and its associated payload when the pitching platform leaves the ends of front and rear guide assemblies 40 and 42. To safeguard against potential damage and unnecessary maintenance, the preferred embodiments of the invention include braking mechanisms to stop the rotational movement of the pitching platform.

One arrangement for stopping the rotation of the front end of pitching platform 34 is incorporated in the above described A-frames 86. Referring back to FIGS. 7 and 8, the arrangement includes brake units 100 that are mounted to the top of slider blocks 90. Each brake unit 100 includes linear travel pneumatic pistons that extend outwardly and apply braking force to the oppositely disposed inside walls of slot 88. Preferably, the braking force asserted by braking units 100 does not change during operation of the invention. In particular, braking units 100 preferably assert a braking force that does not overcome the reaction force asserted by front guide assemblies 40 while the guide members 38 are traveling along the front guide assemblies 40. However, when the forward end of pitching platform 34 passes beyond the front guide assemblies 40, the reaction force is no longer present and the braking force asserted by braking unit 100 is strong enough to stop further movement of the forward end of pitching platform 34.

Figure 11:
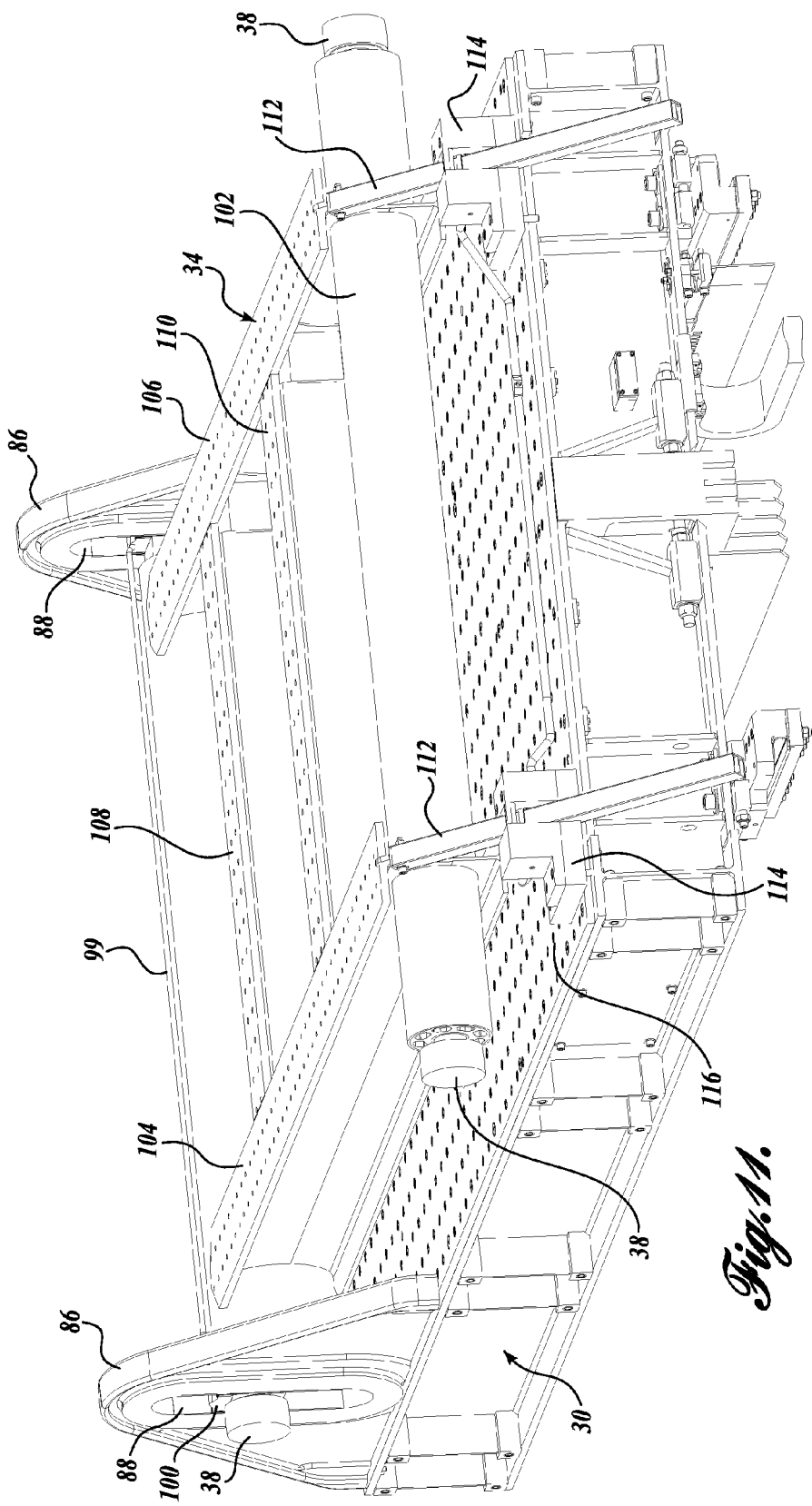
FIG. 11 illustrates a pitching platform with the aft end thereof coupled to the crash sled main platform by a braking system that prevents movement of the pitching platform when pitching simulation is complete and the crash sled continues to move.

FIG. 11 depicts an arrangement for stopping rotation of the aft end of pitching platform 34 when pitching platform 34 passes from front and rear guide assemblies 40 and 42. In the arrangement of FIG. 11, the forward and aft ends of pitching platform 34 are formed by cylindrical beams 99 and 102, with the sides of the pitching platform being formed by I-beams 104 and 106. Spaced-apart reinforcing beams 108 and 110 extend between I-beams 104 and 106 to provide structural rigidity.

As can be seen in FIG. 11, the upper flanges of I-beams 104 and 106 extend over cylindrical beam 102. Brake bars 112 of rectangular cross-section are pivotably mounted to the end of I-beams 104 and 106 and extend downwardly through brake units 114 that are mounted on the upper surface 116 of main sled 30. Located inside brake units 114 are pistons that exert a braking a force on oppositely disposed surfaces of brake bars 112. As is the case with front brake 100, the braking force applied by braking units 114 is substantially constant, not being substantial enough to prevent movement of the pitching platform 34 during a crash simulation, but being adequate to stop motion of the aft end of the pitching platform 34 when it passes from rear guide assembly 42.

Embodiments of the invention that incorporate A-frames 86 at the forward end of main sled 30 preferably include an additional braking mechanism to eliminate or minimize damage in the event a malfunction or emergency procedure abruptly stops main sled 30 during the simulation process. In that regard, if main sled 30 suddenly stops, a significant force is exerted on the sled below the center of gravity of pitching platform 34 and its payload. The result is the rotation of pitching platform 34 in a direction (clockwise in the figures) that can cause the assembly of the guide members 38, slider blocks 90, and brake units 100 to impact against the upper ends of A-frame slots 88 at a velocity sufficient to cause damage.

The walls of slider block 90 and slot 88 of the A-frame 86 shown in FIG. 12 are configured and arranged to eliminate or greatly reduce damage to the A-frames and components located in slots 88. In the arrangement of FIG. 12, the aft-most wall of slider block 90 includes a series of outwardly projecting teeth 118. Located along the adjacent wall of slot 88 is a replaceable liner 120 that covers the area of the slot wall that is traveled by slider block 90. Teeth 118 are formed of a hard metal, either being formed in, or joined to, the wall of slider block 90. Liner 120 is less hard than teeth 118, being made of metal or other material that is selected on the basis of yield strength. In particular, the yield strength of liner 120 is high enough that teeth 118 pass along the surface of the liner during normal operation, including when main sled 30 is brought to a stop at the end of a crash pulse simulation. On the other hand, the yield strength of lining 120 is low enough that teeth 118 penetrate the surface of lining 120 if main sled 30 is stopped abruptly enough to cause pitching platform 34 to move rapidly and forcibly in the rearward direction. Depending on the degree to which teeth 118 penetrate lining 120, the system components located in slot 88 will either be brought to a complete stop or slowed to a point at which significant damage does not occur.

FIG. 13 illustrates a third embodiment of the invention. In FIG. 13, the invention is shown in the pre-launch position, with components common to the embodiments of FIGS. 2, 5, and 6 being identified by reference numerals that were used with respect to those embodiments.

The arrangement of FIG. 13 operates in basically the same manner as the previously discussed embodiments of FIGS. 2 and 6. In particular, the crash sled includes a main sled 30 and a pitching platform 34 that is located above the surface of the main sled. Further, when the sled is launched, the fore and aft ends of pitching platform 34 travel along pathways that are established during the pre-launch procedure and are not varied during the simulation procedure. The differences between the embodiment of FIG. 13 and the previously described embodiments relate to the arrangement for establishing the pathways traveled by pitching platform 34 and the simulation preciseness that is attained.

In FIG. 13, the guide members 38 that are located at the forward end of pitching platform 34 are positioned to travel along a path that is defined by the upper surface of an adjustable front guide assembly 122. As shown in FIG. 13, adjustable front guide assembly 122 includes a longitudinally extending support beam 124 that pivotably joins the forward end of adjustable guide assembly 122 to a support column 44. Located aft of support column 44 is a linear actuator 46 that is pivotably mounted to the foundation or system base structure. A point near the aft end of support beam 124 is pivotably connected to the upper end of linear actuator 46. Linear actuator 46 allows the aft end of adjustable guide assembly 122 to be swung upwardly and downwardly to an angle that corresponds to the basic trajectory that will be followed by the forward end of pitching platform 34 when the system is launched.

FIGS. 14-17 depict the structural arrangement of adjustable front guide assembly 122 and various features of that assembly.

Referring to FIG. 14, forward adjustable guide assembly 122 includes a series of closely-spaced linear actuators 126 (ten are shown in FIG. 14) that are mounted to beam 124 with the piston of each linear actuator extending upwardly through an opening in the beam. Extending upwardly from the piston of each linear actuator 126 is a metal plate 128. Located between adjacent pairs of metal plates 128 is a series of closely spaced metal plates 130. For descriptive purposes, plates 128 are referred to herein as active plates and plates 130 are referred to as passive plates.

As is indicated in FIG. 14, the assembly of active plates 128 and passive plates 130 is joined together by a shaft 132 that extends between a linear hydraulic actuator 134 that is located at the forward end of adjustable guide assembly 122 and an upwardly extending arm 136 at the aft end of beam 124. The end portion of shaft 132 is threaded and secured with a threaded hex nut so that the assemblage of active and passive guide plates can be tightly clamped together by rotary actuator 134. Extending along the upper surface of the assembled active and passive plates 128 and 130 is a flexible metal strip 138 that forms the travel path for a forward guide member 38 in the arrangement of FIG. 13.

Figure 15:
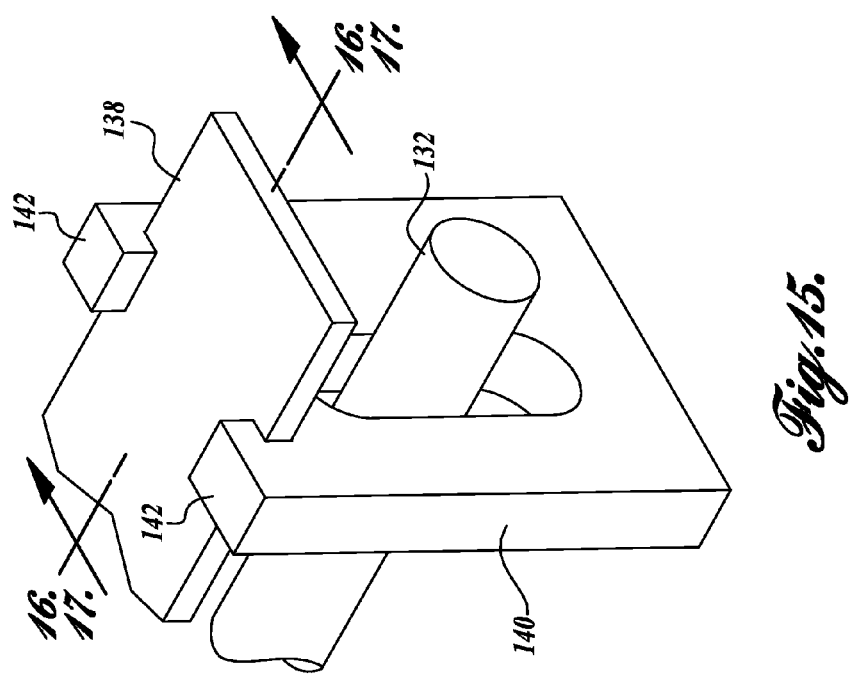

FIG. 15 more clearly depicts the relationship between flexible metal strip 138 and active and passive guide plates 128 and 130. Shown in FIG. 15 is a guide plate 140 generically representative of active guide plates 128 and passive guide plates 130. Inwardly extending flanges 142 are located at the top of guide plate 140 and, thus, are present in both active guide plates 128 and passive guide plates 130. When the active and passive guide plates are assembled, as shown in FIG. 14, the inwardly extending flanges 142 form channels that capture flexible metal strip 138.

Figure 16A:
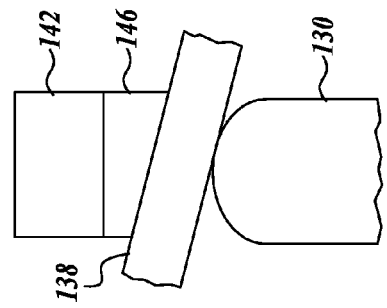
FIGS. 15-17 illustrate detailed aspects of the front guide assembly depicted in FIG. 14.
Figure 17A:
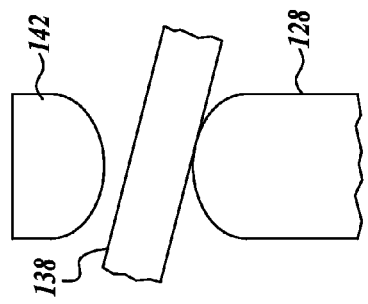
Figure 16B:
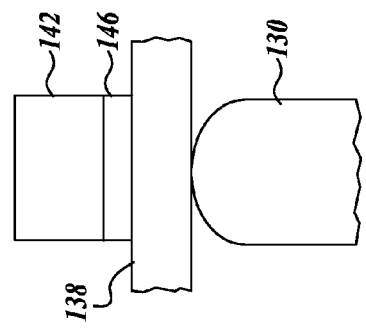
Figure 17B:
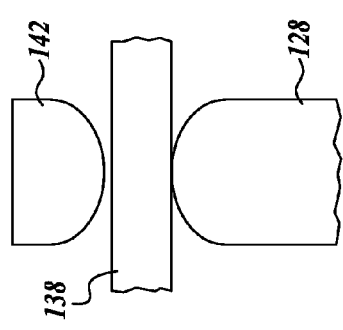

FIGS. 16A and 16B are cross-sectional views, taken along lines 16-16 of FIG. 15 that illustrate the relationship between the flanged region of passive guide plate 130 and flexible metal strip 138. FIG. 16A depicts a section of flexible metal strip 138 horizontally positioned in the channel formed in passive guide plate 130 by flanges 142. As shown in FIG. 16A, the boundary region of passive guide plate 130 that lies below and between flanges 142 is radiused. Attached to the lower surface of flange 142 is elastomeric pad 146 that is under compression and urges flexible metal strip 138 against the radiused boundary of passive guide plate 130. As is indicated in FIG. 16B, elastomeric pad 146 also urges flexible metal strip 138 against the radiused boundary of passive guide plate 130 when flexible metal strip 138 is at an inclined angle relative to passive guide plate 130. FIGS. 17A and 17B are cross-sectional views, taken along lines 17-17 of FIG. 15, that depict metal strip 138 horizontally positioned in the channel of active guide plate 128, and flexible metal strip 138 that is inclined at an angle relative to the guide plate. As can be seen in both FIGS. 17A and 17B, the lower surface of flange 142 and the boundary surface of active guide plate 128 that lies below and between flanges 142 is radiused. Thus, each active guide plate 128 includes an open gap between the lower surfaces of flanges 142 and the radiused boundary edge of the active guide plate.

As described relative to FIG. 14, the position of each active guide plate 128 is established by an associated linear actuator 126 with interstitial gaps between pairs of adjacent active guide plates being filled by a collection of closely spaced passive guide plates 130. Thus, it can be recognized that by suitably adjusting linear actuators 126, the longitudinal profile of flexible metal strip 138 can be established as a straight line, a line of desired curvature, or a line that includes one or more wave-like undulations.

In each profile established with actuators 126, flexible metal strip 138 passes freely through the channels formed in active guide plates 128 and is maintained against the radiused boundary edges of passive guide plates 130. When linear actuators 126 have been operated to establish a desired profile, linear hydraulic actuator 134 of FIG. 14 is activated to clamp the assemblage of active guide plates 128 and passive guide plates 130 together to form a structurally rigid guide path for pitching platform 34.

Referring back to FIG. 13, the depicted embodiment of the invention includes an adjustable rear guide assembly 150 that is configured and arranged in the same manner as adjustable front guide assembly 122. As shown in FIG. 13, adjustable rear guide assembly 150 is pivotably connected to the upper end of a support column 152 with active and passive guide plates 128 and 130 extending downwardly. In this arrangement, guide members 38 at the aft end of pitching platform 34 are in contact with the forward end of flexible metal strip 138 of adjustable rear guide assembly 150. Located aft of support column 152 is an upwardly extending support column 154. A linear actuator 156 is pivotably attached to the upper end of support column 154 with the other end of the linear actuator being pivotably attached to support beam 124 of adjustable rear guide assembly 150.

Operation of the embodiment in the invention shown in FIG. 13 is as follows. Prior to launch, linear actuator 46 of adjustable front guide assemblies 122 and linear actuators 156 of adjustable rear guide assemblies 150 are activated to establish the inclination of the front and rear guide assemblies. The inclination angles of front adjustable guide assemblies 122 and adjustable rear guide assemblies 150 are set in the same manner as guide assemblies 40 and 42 in the embodiments of FIGS. 2 and 6. That is, when the inclination angles of the front and rear adjustable guide assemblies are appropriately set, the front and rear guide assemblies extend along lines that correspond to linear approximations to travel paths that result in pitching platform 34 simulating the pitching motion that accompanied one or more crash events. As was described relative to FIGS. 2 and 6, the inclination angles of the front and rear guide assemblies can be determined based on sensors included in or associated with linear actuator 46 and linear actuator 156. Further, in the arrangement of FIG. 13, the inclination angles can also be determined by measuring or otherwise observing the inclination angles of support beams 124.

Either prior to or after establishing the desired inclination of the front and rear guide assemblies, guide assembly actuators 126 are operated as described above to appropriately establish the surface contours of flexible guide strips 138. Specifically, when appropriately contoured, flexible guide strips 138 of the front and rear adjustable guide assemblies 122 complement the linear approximations established by the guide assembly inclinations so that the travel paths of the forward and aft ends of pitching platform 34 will result in simulation of pitch experienced by vehicles during related crash events.

When main sled 30 is launched, the forward end of pitching platform 34 travels downwardly along the front guide assemblies 122 causing the guide members 38 at the aft end of the pitching platform to bear against and travel along flexible metal guide strips 138 of rear guide assemblies 150. Thus, when accelerated along with main sled 30, pitching platform 34 of the embodiment shown in FIG. 13 precisely simulates the pitching motion that occurred during a crash event.

FIG. 18 illustrates a fourth embodiment of the invention, which is depicted after system launch, but prior to the time at which simulation is complete. Components in FIG. 18 that are common to the embodiments of FIGS. 2, 5, 6, and 13 are identified with the reference numerals used in describing those embodiments. Structurally, the arrangement shown in FIG. 18 basically corresponds to the structure discussed with respect to the embodiments of FIGS. 2, 6, and 13. In particular, the depicted system includes a main sled 30 and a pitching platform 34 that is located above the surface of the main sled. In each case, simulation of vehicle pitching motion is attained by setting front and rear guide assemblies (40 and 42 in FIGS. 2 and 6, 122 and 150 in FIG. 13) at predetermined angles of inclination before the system is launched. As previously discussed, the predefined angles define straight line travel paths for the forward and aft ends of pitching platform 34. Deviation from the straight line travel paths are defined by the pathways of the front and rear forward guide assemblies—the result being travel paths for the foreword and aft ends of pitching platform 34 that can be straight, smoothly curved, or of compound curvature.

Comparing FIG. 18 with FIG. 13, it can be seen that the primary difference between the depicted arrangements is the configuration of the front and rear guide assemblies (122 and 150 in FIGS. 13, 160 and 162 in FIG. 18). Notably, both front and rear guide assemblies 160 and 162 in FIG. 18 extend in the upward direction, whereas forward guide assembly 122 of FIG. 13 extends upwardly and rear guide assembly 150 extends downwardly.

Figure 19:
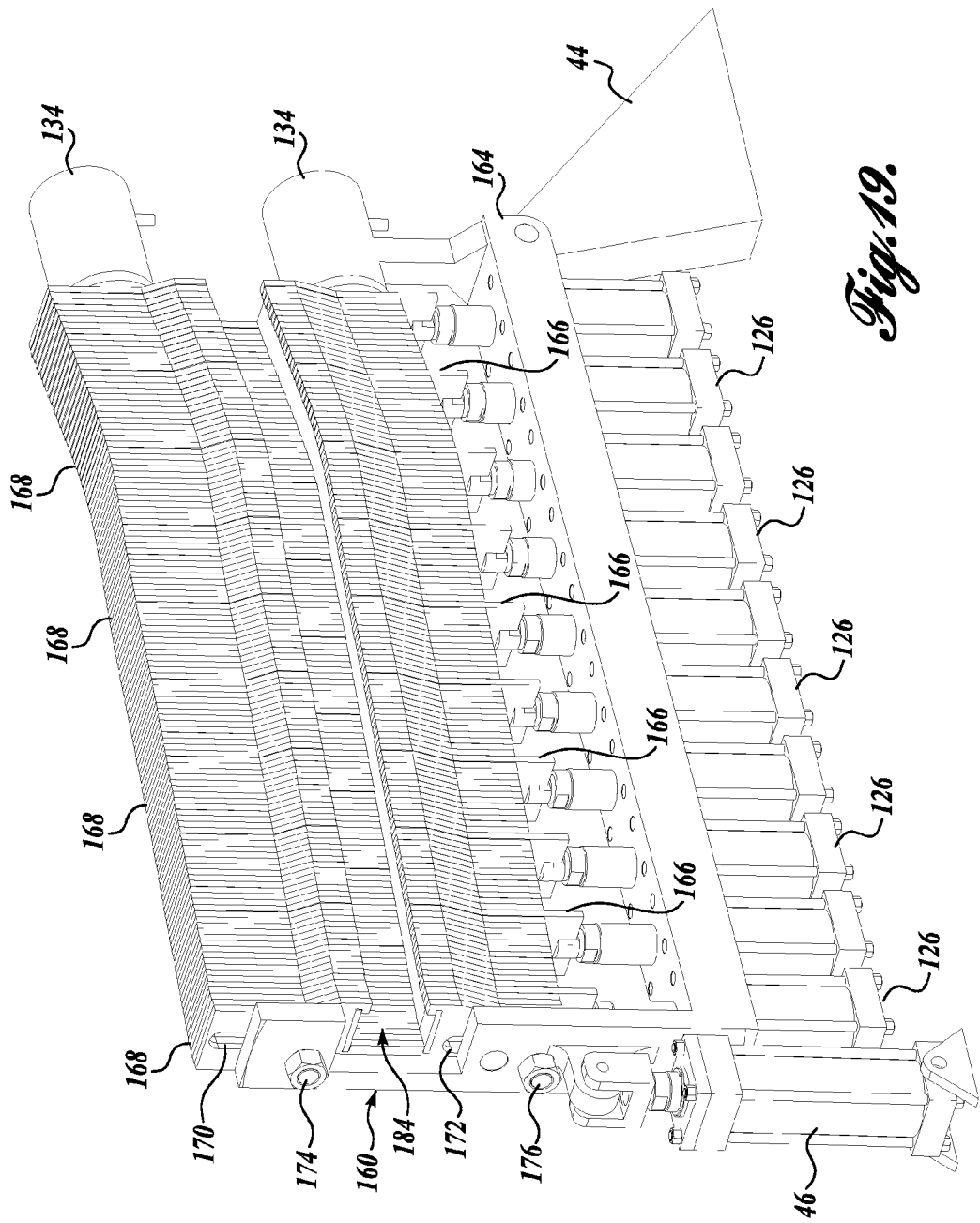
FIG. 19 is an isometric view depicting the structural configuration of the adjustable front guide assembly of the embodiment shown in FIG. 18.
Figure 20:
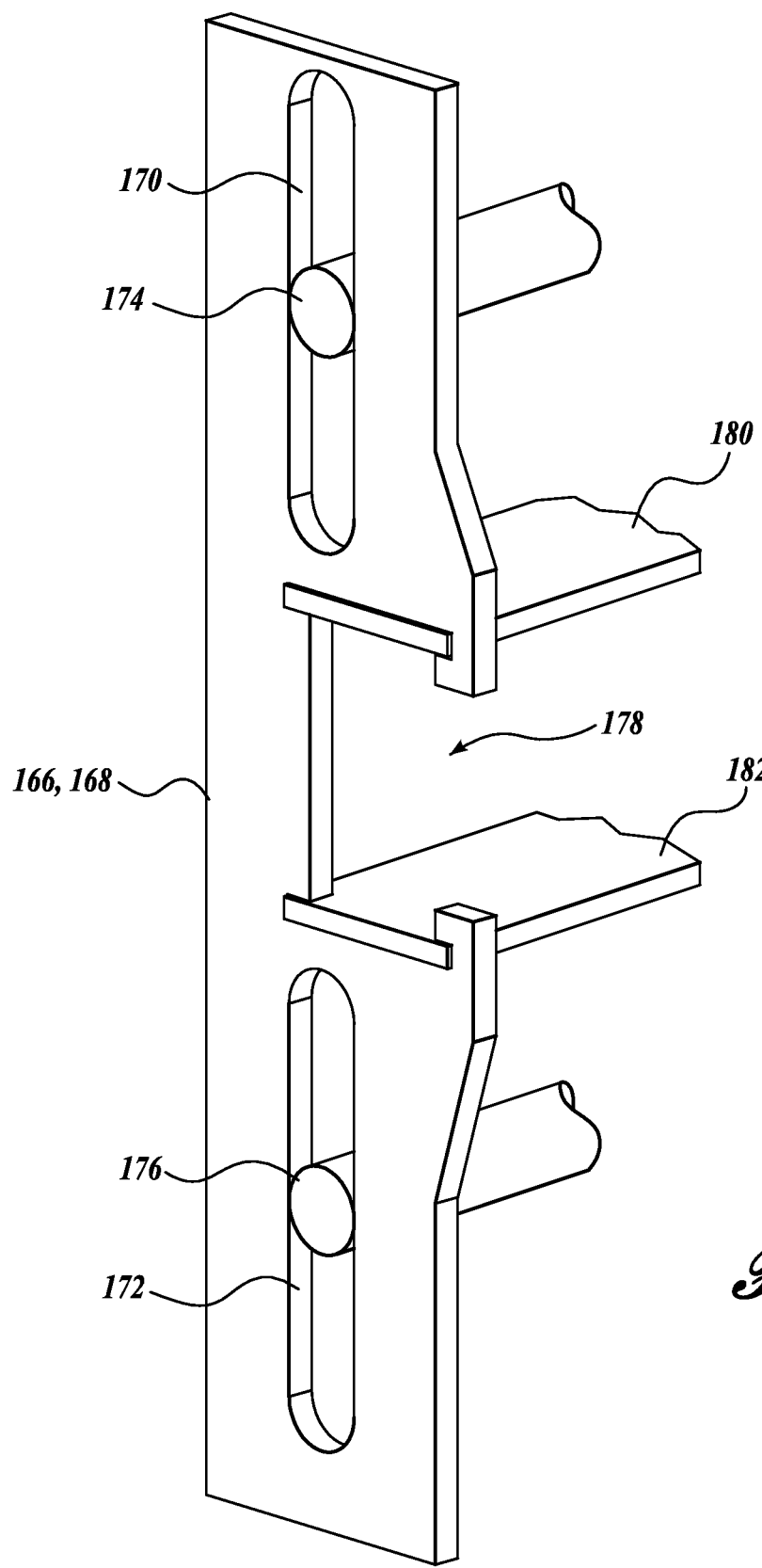
FIG. 20 illustrates plates that allow selective contouring of passageways formed in the adjustable front and rear guide assemblies of FIGS. 18 and 19.

The configuration of front and rear adjustable guide assemblies 60 and 62 is identical, which is best shown in FIGS. 19 and 20. FIG. 19 is an isometric view of front guide assembly 160 of FIG. 18, as seen from the side of the guide assembly that faces pitching platform 34. As can be seen in FIG. 19, front guide assembly 160 is similar to front guide assembly 122 of FIG. 13 in that it includes a longitudinally extending support beam 164 that pivotably joins the forward end of adjustable guide assembly 160 to a support column 44. Located aft of support column 44 is a linear actuator 46 that is pivotably mounted to the foundation or system base structure. Similarity also exists in that the aft end of support beam 124 is pivotably connected to the upper end of linear actuator 46. As was described relative to the arrangement of FIG. 13, linear actuator 46 allows the aft end of adjustable guide assembly 160 to be swung upwardly and downwardly to an angle that defines one component (a straight line) of the trajectory that will be followed by the forward end of pitching platform 34 when the system is launched. Another similarity is that a series of closely spaced linear actuators 126 (ten in FIGS. 18 and 19) are mounted to the lower surface of beam 164 with the piston of each linear actuator 126 extending upwardly through an opening in the beam. Extending upwardly from the piston of each linear actuator 126 is a metal plate 166. Located between adjacent pairs of metal plates 166 is a series of closely spaced metal plates 168. For descriptive purposes, plates 166 are referred to herein as active plates and plates 168 are referred to as passive plates.

The currently preferred configuration of active and passive plates 166 and 168 is shown in FIG. 20. Each plate 166 and 168 is substantially rectangular in shape. Located near the top edge of each plate is a slot 170 that extends downwardly relative to the orientation of forward guide assembly 160 that is shown in FIGS. 18 and 19. Located near the bottom edge of each plate 166 and 168 is an identically configured slot 172 that extends upwardly in alignment with slot 170. When plates 166 and 168 are assembled (as shown in FIGS. 18 and 20), a shaft 174 extends through slot 170 and a shaft 176 extends through slot 172. With this arrangement, slots 170 and 172 allow actuators 126 to move plates 166 upwardly and downwardly to thereby selectively position plates 126 and establish suitable travel paths for the forward and aft ends of pitching platform 34.

Each plate 166 and 168 of FIGS. 19 and 20 also includes a substantially "C-shaped" opening 178 that is located between the lower end of slot 170 and the upper end of slot 172. In this arrangement, the "C-shaped" opening is located along one edge of each plate 166 and 168. Located along upper and lower oppositely disposed edges of the central portion of openings 178 are flexible metal strips 180 and 182.

As is best shown in FIGS. 18 and 19, when active plates 166 and passive plates 168 are assembled, the collection of "C-shaped" openings 178 forms a passageway 184. Although not shown in the FIGURES, guide members 38 that are located at the forward and aft ends of pitching platform 34 ride within passageways 184 of the above-described front guides assemblies 160 and the identically configured rear guide assemblies 162.

Operation of the embodiment in the invention show in FIG. 18 is substantially as was described relative to FIG. 13. Prior to launch, the inclination angles of front adjustable guide assemblies 160 and adjustable rear guide assemblies 162 are set so that the guide assemblies extend along linear approximations to travel paths that result in pitching platform 34 simulating the pitching motion that accompanied one or more crash events. Either prior to or after establishing the inclination of the front and rear guide assemblies, guide assembly actuators 126 are operated to establish the contour of passageways 184 of front and rear guide assemblies 160 and 162. Specifically, active plates 166 are positioned by operation of actuators 126, with flexible strips 180 and 182 causing passive plates 168 to form smooth transitions between adjacent pairs of active plates 166. When the active and passive plates are positioned to establish the desired contours in front and rear guide assemblies 160 and 162, linear hydraulic actuators 134 (shown in FIGS. 18 and 19) are activated to clamp the active and passive plates 166 and 168 into an essentially integral unit.

When main sled 30 is launched, the guide members 38 (rollers or slides) located at the forward end of pitching platform 34 travel along passageways 184 of front guide assemblies 160. Since guide assemblies 160 are typically inclined downwardly, the guide members at the forward end of pitching platform 34 primarily travel in contact with flexible metal strips 182. Conversely, rear guide assemblies 162 are typically upwardly inclined. Thus, guide members 28 at the aft end of pitching platform 34 primarily travel in contact with flexible metal strip 180.

While illustrative embodiments have been illustrated and described, it will be appreciated that various changes can be made therein without departing from the spirit and scope of the invention. For example, although the described embodiments use guide members, the invention can be arranged so that the four corners of the pitching platform include outwardly projecting members that slide along the guide assemblies. Further, the guide assemblies can be formed as rails with the four corners of the pitching platform including outwardly extending fixtures that partially surround and slide along the rails. Even further, the left and right forward and/or rear guide assemblies can exhibit different profiles or contours to impart a rolling characteristic to the simulation deceleration and pitching that is associated with a vehicle crash.

The embododiments of the invention in which an exclusive property or privilege is claimed are defined as follows:

1. A crash sled system for simulating deceleration and pitching motion associated with a vehicle crash comprising:
   a main sled configured for being catapulted from a prelaunch position and accelerated along a longitudinal path;
   a pitching platform that is positioned above and configured for concurrent movement with the main sled;
   front guide assemblies that extend along the forward end of each side of the main sled when the main sled is in a pre-launch position, each of the front guide assemblies defining a front path, the pitching platform having a forward end engaging the front guide assemblies for travel along the front paths;
   one or more front guide actuators interconnected with each of the front guide assemblies, the one or more front guide actuators being operable for selectively positioning the front guide assemblies at a first predetermined inclination angle;
   rear guide assemblies that extend along the aft end of each side of the main sled when the main sled is in the prelaunch position, each of the rear guide assemblies defining a rear path, the pitching platform having a rear end engaging the rear guide assemblies for travel along the rear paths;
   one or more rear guide actuators interconnected with each of the rear guide assemblies, the one or more rear guide actuators being operable for selectively positioning the rear guide assemblies at a second predetermined inclination angle; and
   wherein the first predetermined inclination angle and the second predetermined inclination angle are established with the main sled in the pre-launch position to determine pitching motion induced in the pitching platform during its concurrent movement with the main sled.

2. The crash sled system of claim 1 wherein at least one of the front and rear paths is a substantially straight line path.

3. The crash sled system of claim 2 wherein:
   the at least one substantially straight line path corresponds to a calculated reference path traveled by a first reference location to simulate at least one particular crash.

4. The crash sled system of claim 3 wherein the at least one substantially straight line path is determined by linear regression of data that corresponds to the reference path.

5. The crash sled system of claim 4 wherein the linear regression is a least-squares linear approximation.

6. The crash sled system of claim 1 wherein at least one of the front and rear paths is non-linear.

7. The crash sled system of claim 6 wherein the at least one non-linear path is a smooth curve.

8. The crash sled system of claim 7 wherein:
   the at least one non-linear path corresponds to a calculated reference path traveled by a first reference location to simulate at least one particular crash.

9. The crash sled system of claim 8 wherein the at least one non-linear path is determined by non-linear regression of data that corresponds to the reference path.

10. The crash sled system of claim 1 wherein the forward and aft ends of the pitching platform include outwardly projecting guide members for travel along the front and rear paths, respectively, and wherein the system further comprises a pair of spaced apart A-frame assemblies, mounted to and extending upwardly at the forward end of the main sled with each A-frame assembly including a vertical slot, the forward end of the pitching platform being positioned between the A-frame assemblies, with the outwardly projecting guide members of the forward end of the pitching platform passing through the vertically extending slots of the A-frames for engagement with the forward guide assemblies.

11. The crash sled system of claim 10 wherein the vertical slot of each A-frame includes oppositely disposed fore and aft walls and each A-frame assembly includes a slider block that is contained in the slot, the slider block being dimensioned and arranged for upward and downward movement in the slot, each outwardly projecting guide member at the forward end of the pitching platform extending through an associated slider block to allow limited upward and downward movement of the forward end of the pitching platform relative to the main sled.

12. The crash sled system of claim 11 wherein:
   the guide members at the forward end of the pitching platform contact and slide along the front guide assemblies when the main sled is catapulted from the pre-launch position; and
   the guide members at the aft end of the pitching platform contact and slide along the rear guide assemblies when the main sled is catapulted from the pre-launch position.

13. The crash sled system of claim 12 wherein:
   the front guide assemblies, the one or more front guide actuators interconnected with each of the front guide assemblies, the rear guide assemblies, and the one or more rear guide actuators interconnected with each of the rear guide assemblies are mounted to the foundation that supports the crash sled system; and the guide members at the forward and aft end of the pitching platform pass free of contact with the front and rear paths upon completion of the pitching simulation.

14. The crash sled system of claim 13, further comprising forward and aft brake units for restraining rotational movement of the pitching platform when the guide members at the forward and aft ends of the pitching platform pass free of contact with the front and rear paths of the front and rear guide assemblies.

15. The crash sled system of claim 14 wherein:

a forward brake unit for restraining rotational movement of the pitching platform is mounted to the top of the slider block of each A-frame, each forward brake unit including pistons for asserting braking force against the oppositely disposed fore and aft walls of the A-frame vertical slot; and the aft brake unit includes brake bars that are mounted at the rear end of the pitching platform, the brake bars being spaced apart from one another and extending downwardly from the aft end of the pitching platform, the aft brake unit further including spaced apart brake modules for receiving and at least partially surrounding the brake bars, the brake modules including pistons for asserting a braking force on the brake bars.

16. The crash sled system of claim 15 wherein:

the forward brake units assert a substantially constant braking force both when the guide members at the forward end of the pitching platform are moving along the front paths and when the guide members pass free of the front paths of the front guide assemblies, the substantially constant braking force of the forward brake units not being large enough to overcome the reaction force asserted by the front guide assemblies while the guide members at the front of the pitching platform are moving along the front paths of the front guide assemblies but being large enough to stop movement of the front end of the pitching platform when the guide assemblies pass from the front paths; and the aft brake units assert a substantially constant braking forces both when the guide members at the aft end of the pitching platform are moving along the rear paths of the aft guide assemblies and when the guide members pass free of the rear paths, the substantially constant braking force of the aft brake units not being large enough relative to overcoming the reaction force asserted by the rear guide assemblies while the guide members at the aft end of the pitching platform are moving along the rear paths of the rear guide assemblies but being large enough to stop movement of the aft end of the pitching platform when the guide assemblies pass from the rear paths.

17. The crash sled system of claim 11 wherein:

the guide members at the forward end of the pitching platform include rollers that travel along the front paths of the front guide assemblies when the main sled is catapulted from the pre-launch position; and the guide members at the aft end of the pitching platform include rollers that travel along the rear paths of the rear guide assemblies when the main sled is catapulted from the pre-launch position.

18. The crash sled system of claim 17 wherein:

the front guide assemblies, the one or more front guide actuators interconnected with each of the front guide assemblies, the rear guide assemblies, and the one or more rear guide actuators interconnected with each of the rear guide assemblies mounted to the foundation that supports the crash sled system; and the guide member rollers at the forward and aft end of the pitching platform pass free of contact with the front and rear paths upon completion of the pitching simulation.

19. The crash sled system of claim 17, further comprising forward and aft brake units for restraining rotational movement of the pitching platform when the rollers at the forward and aft ends of the pitching platform pass free of contact with the guide paths of the front and rear guide assemblies.

20. The crash sled system of claim 17 wherein:

a forward brake unit for restraining rotational movement of the pitching platform is mounted to the top of the slider block of each A-frame, each forward brake unit including pistons for asserting braking force against the oppositely disposed fore and aft walls of the A-frame vertical slot; and the aft brake unit includes brake bars that are mounted at the rear end of the pitching platform, the brake bars being spaced apart from one another and extending downwardly from the rear end of the pitching platform, the aft brake unit further including spaced apart brake modules for receiving and at least partially surrounding the brake bars, the brake modules including pistons for asserting a braking force on the brake bars.

21. The crash sled system of claim 20 wherein:

the forward brake units assert a substantially constant braking force both when the guide members at the forward end of the pitching platform are moving along the front paths and when the guide members pass free of the front paths of the front guide assemblies, the substantially constant braking force of the forward brake units not being large enough to overcome the reaction force asserted by the front guide assemblies while the guide members at the front of the pitching platform are moving along the front paths of the front guide assemblies but being large enough to stop movement of the front end of the pitching platform when the guide assemblies pass from the front paths; and the aft brake units assert a substantially constant braking force both when the guide members at the aft end of the pitching platform are moving along the rear paths of the aft guide assemblies and when the guide members pass free of the rear paths of the aft guide assemblies, the substantially constant braking force of the aft brake units not being large enough relative to overcoming the reaction force asserted by the rear guide assemblies while the guide members at the aft end of the pitching platform are moving along the rear paths of the rear guide assemblies but being large enough to stop movement of the aft end of the pitching platform when the guide assemblies pass from the rear paths.

22. The crash sled system of claim 11 wherein at least a portion of the aft wall of the vertical slot of each A-frame assembly is covered with a liner and the region of the slider block facing the liner includes teeth projecting toward the liner, the yield strength of the liner being high enough that the teeth pass along the liner during normal operation of the crash sled and being low enough that the teeth engage the liner and apply a braking force to the forward end of the pitching platform in the event the main sled is being abruptly stopped.

* * * * *